(12) United States Patent
Sealey, II et al.

(10) Patent No.: US 12,553,189 B2
(45) Date of Patent: *Feb. 17, 2026

(54) ABSORBENT STRUCTURES WITH HIGH STRENGTH AND LOW MD STRETCH

(71) Applicant: First Quality Tissue, LLC, Great Neck, NY (US)

(72) Inventors: James E. Sealey, II, Belton, SC (US); Justin S. Pence, Anderson, SC (US); Marc Paul Begin, Simpsonville, SC (US); Zachary Korkowski, Greenville, SC (US); Byrd Tyler Miller, IV, Easley, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,675

(22) Filed: Feb. 24, 2020

(65) Prior Publication Data
US 2020/0347556 A1 Nov. 5, 2020

Related U.S. Application Data

(60) Provisional application No. 62/842,941, filed on May 3, 2019.

(51) Int. Cl.
*D21H 27/40* (2006.01)
*A47K 10/06* (2006.01)
(Continued)

(52) U.S. Cl.
CPC ............ *D21H 27/40* (2013.01); *A47K 10/06* (2013.01); *A47K 10/16* (2013.01); *B32B 29/02* (2013.01); *D04H 1/4282* (2013.01); *D04H 1/4291* (2013.01); *D21H 17/46* (2013.01); *D21H 27/007* (2013.01); *D21H 27/30* (2013.01); *B32B 5/024* (2013.01); *B32B 2262/062* (2013.01); *B32B 2307/51* (2013.01); *D10B 2401/02* (2013.01); *D21H 27/02* (2013.01)

(58) Field of Classification Search
CPC ...... D21H 27/40; D21H 27/007; B32B 29/02; B32B 5/024; B32B 2262/062; B32B 2307/51
See application file for complete search history.

(56) References Cited

U.S. PATENT DOCUMENTS 2,926,154 A 2/1960 Keim
3,049,469 A 8/1962 Davison
(Continued)

FOREIGN PATENT DOCUMENTS

WO 2009067079 A1 5/2009

OTHER PUBLICATIONS

David Loebker, Jeffrey Sheehan, The Procter & Gamble Company, Paper Towel Absorptive Properties and Measurement using a Horizontal Gravimetric Device, Published 2011, 9 pages.

*Primary Examiner* — Alicia J Weydemeyer
(74) *Attorney, Agent, or Firm* — Amster, Rothstein & Ebenstein LLP

(57) ABSTRACT

Absorbent product including a laminate of at least two plies, wherein the absorbent product has a measured Y-Connected Area parameter greater than 20 and a Surface Channel Spacing of less than 2.5 mm. The absorbent product has high strength and low machine direction stretch.

10 Claims, 15 Drawing Sheets

(51) Int. Cl.
  *A47K 10/16* (2006.01)
  *B32B 5/02* (2006.01)
  *B32B 29/02* (2006.01)
  *D04H 1/4282* (2012.01)
  *D04H 1/4291* (2012.01)
  *D21H 17/46* (2006.01)
  *D21H 27/00* (2006.01)
  *D21H 27/02* (2006.01)
  *D21H 27/30* (2006.01)

(56) References Cited

U.S. PATENT DOCUMENTS

| | | | |
|---|---|---|---|
| 3,058,873 A | 10/1962 | Keim et al. | |
| 3,066,066 A | 11/1962 | Keim et al. | |
| 3,125,552 A | 3/1964 | Loshaek et al. | |
| 3,186,900 A | 6/1965 | Young et al. | |
| 3,197,427 A | 7/1965 | Schmalz et al. | |
| 3,224,986 A | 12/1965 | Butler et al. | |
| 3,224,990 A | 12/1965 | Babcock et al. | |
| 3,227,615 A | 1/1966 | Korden | |
| 3,227,671 A | 1/1966 | Keim | |
| 3,239,491 A | 3/1966 | Tsou et al. | |
| 3,240,664 A | 3/1966 | Earle | |
| 3,240,761 A | 3/1966 | Keim et al. | |
| 3,248,280 A | 4/1966 | Hyland, Jr. | |
| 3,250,664 A | 5/1966 | Conte et al. | |
| 3,311,594 A | 3/1967 | Earle, Jr. | |
| 3,329,657 A | 7/1967 | Strazdins et al. | |
| 3,332,834 A | 7/1967 | Reynolds, Jr. | |
| 3,332,901 A | 7/1967 | Keim | |
| 3,352,833 A | 11/1967 | Earle, Jr. | |
| 3,414,459 A | 12/1968 | Wells | |
| 3,442,754 A | 5/1969 | Espy | |
| 3,459,697 A | 8/1969 | Goldberg et al. | |
| 3,473,576 A | 10/1969 | Amneus | |
| 3,483,077 A | 12/1969 | Aldrich | |
| 3,556,907 A | 1/1971 | Nystrand | |
| 3,556,932 A | 1/1971 | Coscia et al. | |
| 3,556,933 A | 1/1971 | Williams et al. | |
| 3,573,164 A | 3/1971 | Friedberg et al. | |
| 3,609,126 A | 9/1971 | Asao et al. | |
| 3,733,290 A | 5/1973 | Williams et al. | |
| 3,778,339 A | 12/1973 | Williams et al. | |
| 3,813,362 A | 5/1974 | Coscia et al. | |
| 3,855,158 A | 12/1974 | Petrovich et al. | |
| 3,877,510 A | 4/1975 | Tegtmeier et al. | |
| 3,905,863 A | 9/1975 | Ayers | |
| 3,911,173 A | 10/1975 | Sprague, Jr. | |
| 3,974,025 A | 8/1976 | Ayers | |
| 3,994,771 A | 11/1976 | Morgan, Jr. et al. | |
| 3,998,690 A | 12/1976 | Lyness et al. | |
| 4,035,229 A | 7/1977 | Rave | |
| 4,098,632 A | 7/1978 | Sprague, Jr. | |
| 4,102,737 A | 7/1978 | Morton | |
| 4,129,528 A | 12/1978 | Petrovich et al. | |
| 4,129,722 A | 12/1978 | Iovine et al. | |
| 4,147,586 A | 4/1979 | Petrovich et al. | |
| 4,191,609 A | 3/1980 | Trokhan | |
| 4,217,425 A | 8/1980 | Ballweber et al. | |
| 4,440,597 A | 4/1984 | Wells et al. | |
| 4,501,862 A | 2/1985 | Keim | |
| 4,514,345 A | 4/1985 | Johnson et al. | |
| 4,515,657 A | 5/1985 | Malanka | |
| 4,528,239 A | 7/1985 | Trokhan | |
| 4,529,480 A | 7/1985 | Trokhan | |
| 4,537,657 A | 8/1985 | Keim | |
| 4,637,859 A | 1/1987 | Trokhan | |
| 4,714,736 A | 12/1987 | Juhl et al. | |
| 4,770,920 A | 9/1988 | Larsonneur | |
| 4,818,341 A | 4/1989 | Degen et al. | |
| 4,885,202 A | 12/1989 | Lloyd et al. | |
| 4,891,249 A | 1/1990 | McIntyre | |
| 4,940,514 A | 7/1990 | Stange et al. | |
| 4,949,688 A | 8/1990 | Bayless | |
| 4,957,977 A | 9/1990 | Itagaki et al. | |
| 4,996,091 A | 2/1991 | McIntyre | |
| 5,082,527 A | 1/1992 | Bachem et al. | |
| 5,085,736 A | 2/1992 | Bjorkquist | |
| 5,143,776 A | 9/1992 | Givens | |
| 5,239,047 A | 8/1993 | Devore et al. | |
| 5,318,669 A | 6/1994 | Dasgupta | |
| 5,320,711 A | 6/1994 | Dauplaise et al. | |
| 5,334,289 A | 8/1994 | Trokhan et al. | |
| 5,502,091 A | 3/1996 | Dasgupta | |
| 5,510,002 A | 4/1996 | Hermans et al. | |
| 5,525,664 A | 6/1996 | Miller et al. | |
| 5,607,551 A | 3/1997 | Farrington, Jr. et al. | |
| 5,614,597 A | 3/1997 | Bower | |
| 5,633,300 A | 5/1997 | Dasgupta | |
| 5,656,699 A | 8/1997 | Dasgupta et al. | |
| 5,674,358 A | 10/1997 | Espy | |
| 5,674,362 A | 10/1997 | Underwood et al. | |
| 5,679,222 A | 10/1997 | Rasch et al. | |
| 5,723,022 A | 3/1998 | Dauplaise et al. | |
| 5,832,962 A | 11/1998 | Kaufman et al. | |
| 5,904,808 A | 5/1999 | Gelman et al. | |
| 5,925,217 A * | 7/1999 | Kaufman | D21H 27/02 162/109 |
| 5,972,691 A | 10/1999 | Bates et al. | |
| 6,039,838 A | 3/2000 | Kaufman et al. | |
| 6,120,642 A | 9/2000 | Lindsay et al. | |
| 6,179,962 B1 | 1/2001 | Brady et al. | |
| 6,224,174 B1 | 5/2001 | Mu | |
| 6,245,874 B1 | 6/2001 | Staib et al. | |
| 6,355,137 B1 | 3/2002 | Staib | |
| 6,376,578 B1 | 4/2002 | Gorzynski et al. | |
| 6,429,253 B1 | 8/2002 | Guerro et al. | |
| 6,616,807 B1 | 9/2003 | Dyllick-Brenzinger et al. | |
| 6,749,721 B2 | 6/2004 | Shannon et al. | |
| 6,821,391 B2 | 11/2004 | Scherb et al. | |
| 6,939,443 B2 | 9/2005 | Ryan | |
| 7,175,740 B2 | 2/2007 | Riehle et al. | |
| 7,291,695 B2 | 11/2007 | Wei et al. | |
| 7,339,378 B2 | 3/2008 | Han et al. | |
| 7,351,307 B2 | 4/2008 | Scherb et al. | |
| 7,387,706 B2 | 6/2008 | Herman et al. | |
| 7,442,278 B2 | 10/2008 | Murray et al. | |
| 7,476,293 B2 | 1/2009 | Herman et al. | |
| 7,488,403 B2 | 2/2009 | Hagiopol et al. | |
| 7,494,563 B2 | 2/2009 | Edwards et al. | |
| 7,510,631 B2 | 3/2009 | Scherb et al. | |
| 7,582,187 B2 | 9/2009 | Scherb et al. | |
| 7,589,153 B2 | 9/2009 | Hagiopol et al. | |
| 7,686,923 B2 | 3/2010 | Scherb et al. | |
| 7,744,726 B2 | 6/2010 | Scherb et al. | |
| 7,811,418 B2 | 10/2010 | Klerelid et al. | |
| 7,828,934 B2 | 11/2010 | Cyr et al. | |
| 7,897,013 B2 | 3/2011 | Hagiopol et al. | |
| 7,902,312 B2 | 3/2011 | Gu et al. | |
| 7,905,989 B2 | 3/2011 | Scherb et al. | |
| 7,922,867 B2 | 4/2011 | Schall et al. | |
| 7,931,781 B2 | 4/2011 | Scherb et al. | |
| 7,951,269 B2 | 5/2011 | Herman et al. | |
| 8,075,739 B2 | 12/2011 | Scherb et al. | |
| 8,092,652 B2 | 1/2012 | Scherb et al. | |
| 8,118,979 B2 | 2/2012 | Herman et al. | |
| 8,196,314 B2 | 6/2012 | Munch | |
| 8,303,773 B2 | 11/2012 | Scherb et al. | |
| 8,382,956 B2 | 2/2013 | Boechat et al. | |
| 8,402,673 B2 | 3/2013 | Da Silva et al. | |
| 8,435,384 B2 | 5/2013 | Da Silva et al. | |
| 8,440,055 B2 | 5/2013 | Scherb et al. | |
| 8,544,184 B2 | 10/2013 | Da Silva et al. | |
| 8,580,083 B2 | 11/2013 | Boechat et al. | |
| 2003/0085010 A1* | 5/2003 | Burazin | D21F 11/006 162/109 |
| 2004/0238135 A1* | 12/2004 | Edwards | D21F 11/145 162/111 |
| 2008/0110591 A1* | 5/2008 | Mullally | D21F 11/006 162/358.2 |
| 2008/0156450 A1 | 7/2008 | Klerelid et al. | |
| 2010/0065234 A1 | 3/2010 | Klerelid et al. | |
| 2011/0180223 A1 | 7/2011 | Klerelid et al. | |

(56) References Cited

U.S. PATENT DOCUMENTS

| | | | |
|---|---|---|---|
| 2016/0130762 A1* | 5/2016 | Ramaratnam | D21F 11/14 |
| | | | 162/175 |
| 2016/0160448 A1* | 6/2016 | Miller, IV | B32B 37/1207 |
| | | | 162/129 |
| 2017/0314207 A1* | 11/2017 | Sealey | D21F 5/181 |
| 2018/0058011 A1* | 3/2018 | Sealey | D21H 17/005 |

* cited by examiner 20X magnification

| Name | TSA | TS7 | Store Location | Store Name | Manufacturer | D | Paper Type | Basis Wt (g/m^2) | Bulk (microns/2ply) | Absorbency (g/g) | MD Strength (N/m) | MD Stretch (%) | CD Strength (N/m) | CD Stretch (%) | CD Wet (N/m) | GMT (N/m) | Ball Burst (gsf) |
|---|---|---|---|---|---|---|---|---|---|---|---|---|---|---|---|---|---|
| Inventive_Example #1 | 58.8 | 16.5 | May, 2024 | | First Quality | 2.1 | TAD | 39.0 | 723.0 | 12.9 | 445.0 | 7.6 | 318.0 | 11.4 | 89.9 | 375.3 | 895.0 |
| Inventive_Example #2 | 48.3 | 20.1 | Jan, 2017 | | First Quality | 2.3 | TAD | 42.7 | 832.0 | 14.2 | 405.0 | 10.1 | 412.0 | 7.7 | 123.1 | 407.5 | 1067.0 |
| Comparative Example | 44.4 | 23.8 | May, 2014 | | First Quality | 2.4 | TAD | 39.9 | 850.0 | 15.9 | 429.0 | 21.4 | 480.8 | 13.3 | 146.0 | 458.9 | 1098.0 |
| Scott (one ply product) | 40.6 | 25.8 | Nov, 2018 | Mill Hall, PA | Walmart | Kimberly-Clark | 2.7 | UCTAD | 34.5 | 845.3 | 8.7 | 294.8 | 16.6 | 253.6 | 11.8 | 85.1 | 273.1 | 860.1 |
| Sparkle | 39.0 | 27.7 | Dec, 2018 | Roseville, CA | Winco Foods | GP | 2.2 | Conventional | 45.0 | 713.8 | 5.8 | 578.2 | 26.7 | 337.1 | 5.6 | 97.6 | 441.1 | 804.4 |
| Brawny | 50.6 | 28.4 | Nov, 2018 | Mill Hall, PA | Walmart | GP | 2.2 | TAD | 29.6 | 761.0 | 12.0 | 359.4 | 25.6 | 356.0 | 7.1 | 106.5 | 357.7 | 733.8 |
| Member's Mark | 46.3 | 15.5 | Nov, 2018 | Greenville, SC | Sams | Orchids | 2.4 | GPT | 28.4 | 786.4 | 7.9 | 398.0 | 22.4 | 281.8 | 8.8 | 68.5 | 335.7 | 473.8 |
| Member's Mark | 45.6 | 24.4 | Dec, 2018 | Roseville, CA | Sam's | Clearwater | 2.2 | TAD | 42.1 | 734.2 | 13.0 | 399.2 | 11.6 | 361.9 | 8.8 | 109.0 | 379.9 | 808.8 |
| Up and UP Make A Size | 47.2 | 19.5 | Nov, 2018 | Target | | Irving | 2.4 | TAD | 49.0 | 797.1 | 13.2 | 447.3 | 16.6 | 367.4 | 8.9 | 135.7 | 405.2 | 979.3 |
| Kirkland Signature | 48.7 | 31.7 | Dec, 2018 | Roseville, CA | Costco | Georgia-Pacific | 2.3 | TAD | 41.0 | 677.7 | 12.8 | 344.3 | 19.4 | 353.8 | 9.6 | 140.2 | 349.0 | 772.6 |
| Bounty | 53.5 | 18.2 | Nov, 2018 | Mill Hall, PA | Walmart | P&G | 2.1 | TAD | 51.9 | 3057.6 | 12.9 | 998.9 | 14.5 | 359.0 | 10.9 | 153.6 | 463.2 | 1255.1 |
| Bounty | 52.0 | 15.2 | Dec, 2018 | Roseville, CA | Sams | P&G | 2.2 | TAD | 53.6 | 986.8 | 11.6 | 549.3 | 12.5 | 418.2 | 7.5 | 146.7 | 478.0 | 1157.2 |
| Bounty | 48.7 | 14.7 | Dec, 2018 | Roseville, CA | Costco | P&G | 2.1 | TAD | 52.4 | 838.2 | 13.0 | 679.8 | 12.9 | 413.3 | 7.7 | 153.4 | 523.6 | 1208.5 |
| Bounty Essentials | 47.2 | 19.1 | Dec, 2018 | Roseville, CA | Safeway | P&G | 2.6 | TAD | 36.3 | 979.1 | 13.5 | 464.2 | 16.1 | 307.0 | 8.2 | 137.1 | 376.5 | 988.0 |
| Viva Multi Surface | 43.3 | 18.2 | Feb, 2019 | Mill Hall, PA | Walmart | Kimberly-Clark | 2.5 | UCTAD | 51.1 | 1070.0 | 13.8 | 459.0 | 15.5 | 360.0 | 11.6 | 127.4 | 421.9 | 1163.0 | continued

| Name | Ball Burst/MD Stretch | Absorbency (g/g)/MD stretch | Softness/MD Stretch | Absorbency * Ball Burst/MD Stretch | Ball Burst * Absorbency/MD Stretch | Softness * Absorbency/MD Stretch | Y Connected Area (%) | SSmax | Channel Angle (Deg) | Str | SD |
|---|---|---|---|---|---|---|---|---|---|---|---|
| Inventive_Example #1 | 111.24 | 1.75 | 7.96 | 7129.2 | 1384.1 | 102.6 | 34.5 | 2.04 | 13.7 | 0.0974 | 0.0029 |
| Inventive_Example #2 | 107.43 | 1.40 | 4.77 | 5283.7 | 1503.1 | 67.6 | 21.5 | 2.15 | 16.5 | 0.3022 | 0.0059 |
| Comparative Example | 51.31 | 0.74 | 2.07 | 1278.1 | 813.8 | 3.9 | 0.0 | 3.06 | NA | 0.8856 | 0.0614 |
| Scott (one ply product) | 39.82 | 0.53 | 2.45 | 1617.4 | 346.8 | 21.3 | 42.7 | 3.0 | 1.0 | 0.1408 | 0.0223 |
| Sparkle | 22.63 | 0.22 | 1.46 | 281.6 | 130.6 | 8.4 | 12.4 | 5.5 | NA | 0.7955 | 0.0793 |
| Brawny | 35.62 | 0.58 | 2.45 | 1803.2 | 426.1 | 29.5 | 4.7 | 2.13 | NA | 0.5384 | 0.0282 |
| Member's Mark | 21.13 | 0.35 | 2.02 | 978.4 | 166.7 | 16.3 | 0.0 | 4.23 | NA | 0.4036 | 0.0193 |
| Member's Mark | 89.32 | 1.12 | 3.93 | 3359.4 | 899.0 | 50.9 | 0.0 | 3.10 | NA | 0.6943 | 0.0367 |
| Up and UP Make A Size | 58.92 | 0.89 | 3.84 | 2783.0 | 773.9 | 57.5 | 0.0 | 2.67 | NA | 0.2219 | 0.1011 |
| Kirkland Signature | 39.78 | 0.66 | 3.51 | 1399.1 | 520.8 | 32.2 | 0.0 | 2.39 | NA | 0.1240 | 0.0571 |
| Bounty | 86.90 | 0.89 | 3.55 | 4468.0 | 1135.8 | 45.8 | 0.0 | 3.29 | NA | 0.5140 | 0.3540 |
| Bounty | 90.76 | 0.92 | 4.15 | 4719.3 | 1049.1 | 48.0 | 0.0 | 3.62 | NA | 0.6467 | 0.1004 |
| Bounty | 93.08 | 0.85 | 3.77 | 4583.9 | 1021.1 | 41.3 | 0.0 | 3.45 | NA | 0.7518 | 0.0694 |
| Bounty Essentials | 97.93 | 1.23 | 4.66 | 4603.5 | 1267.2 | 58.1 | 0.0 | 4.28 | NA | 0.5689 | 0.1244 |
| Viva Multi Surface | 74.89 | 0.76 | 2.79 | 3039.6 | 882.2 | 32.8 | 42.7 | 3.09 | 1.0 | 0.4484 | 0.0797 |

FIG. 7

ABSORBENT STRUCTURES WITH HIGH STRENGTH AND LOW MD STRETCH

RELATED APPLICATIONS

This application claims priority to and the benefit of U.S. Provisional Application No. 62/842,941, filed May 3, 2019 and entitled ABSORBENT STRUCTURES WITH HIGH STRENGTH AND LOW MD STRETCH, the contents of which are incorporated herein by reference in their entirety.

FIELD OF THE INVENTION

The present invention relates to absorbent structures, in particular to disposable paper towels or wipes, with unique surface topography that results in a product with high absorbency, high strength, and high softness with low machine direction stretch.

BACKGROUND

Across the globe there is great demand for disposable, absorbent structures used for household cleaning tasks. Disposable towels and wipes meet this market demand. Disposable paper towels and wipes that are composed of cellulosic based fibers are also nearly 100% renewable and biodegradable, thus catering to those whom are eco-conscience. These disposable absorbent towels and wipes are used for a multitude of tasks that require absorbency and strength. These tasks include absorbing liquid spills, cleaning windows and mirrors, scrubbing countertops and floors, scrubbing and drying dishes, washing/cleaning bathroom sinks and toilets, and even drying/cleaning hands and faces where the attribute of softness becomes important. A disposable towel or wipe that can perform these demanding tasks and be produced at a price point that provides a value proposition to the consumer is advantageous. To maintain a low price point, as well as conserve cellulosic based natural resources, providing for high strength and absorbency using the least amount of material is advantageous.

The industrial methods or technologies used to produce these absorbent structures are numerous. Absorbent structures can be produced using both Water or Air-Laid technologies. The technologies that use water to form the cellulosic (or other natural or synthetic fiber type) webs that comprises the towel or wipe are called Water-Laid Technologies. These include Through Air Drying (TAD), Uncreped Through Air Drying (UCTAD), Conventional Wet Crepe (CWC), Conventional Dry Crepe (CDC), ATMOS, NTT, ETAD, and QRT. Technologies that use air to form the webs that comprise the towel or wipe are called Air-Laid Technologies. To enhance the strength and absorbency of these towels and wipes, more than one layer of web (or ply) can be laminated together using strictly a mechanical process or preferably a mechanical process that utilizes an adhesive.

The Water-Laid technologies of Conventional Dry and Wet Crepe are the predominant method to make these structures. These methods comprise forming a nascent web in a forming structure, transferring the web to a dewatering felt where it is pressed to remove moisture, and adhering the web to a Yankee Dryer. The web is then dried and creped from the Yankee Dryer and reeled. When creped at a solids content of less than 90%, the process is referred to as Conventional Wet Crepe. When creped at a solids content of greater than 90%, the process is referred to as Conventional Dry Crepe. These processes can be further understood by reviewing Yankee Dryer and Drying, A TAPPI PRESS Anthology, pg 215-219, which is herein incorporated by reference. These methods are well understood and easy to operate at high speeds and production rates. Energy consumption per ton is low since nearly half of the water removed from the web is through drainage and mechanical pressing. Unfortunately, the sheet pressing also compacts the web, which lowers web thickness and resulting absorbency. A more detailed description of the Conventional Dry Crepe process follows.

The major steps of the conventional dry crepe process involve stock preparation, forming, pressing, drying, creping, calendering (optional), and reeling the web.

The first step of stock preparation involves selection, blending, mixing, and preparation of the proper ratio of wood, plant, or synthetic fibers along with chemistry and fillers that are needed in the specific tissue grade. This mixture is diluted to over 99% water in order to allow for even fiber formation when deposited from the machine headbox into the forming section. There are many types of forming sections used in conventional papermaking (inclined suction breast roll, twin wire C-wrap, twin wire S-wrap, suction forming roll, and Crescent formers) but all are designed to retain the fiber, chemical, and filler recipe while allowing the water to drain from the web. In order to accomplish this, fabrics are utilized.

After web formation and drainage (to around 35% solids) in the forming section (assisted by centripetal force around the forming roll, and vacuum boxes in several former types), the web is transferred to a press fabric upon which the web is pressed between a rubber or polyurethane covered suction pressure roll and Yankee dryer. The press fabric is a permeable fabric designed to uptake water from the web as the web is pressed in the press section. The press fabric is composed of large monofilaments or multi-filamentous yarns, needled with fine synthetic batt fibers to form a smooth surface for even web pressing against the Yankee dryer. Removing water via pressing results in low energy consumption.

After pressing the sheet between a suction pressure roll and a steam heated cylinder (referred to as a Yankee dryer), the web is dried from up to 50% solids to up to 99% solids using the steam heated cylinder and hot air impingement from an air system (air cap or hood) installed over the steam cylinder. The sheet is then creped from the steam cylinder using a steel or ceramic doctor blade. This is a critical step in the conventional dry crepe process. The creping process greatly affects softness as the surface topography is dominated by the number and coarseness of the crepe bars (finer crepe is much smoother than coarse crepe). Some thickness and flexibility is also generated during the creping process. If the process is a wet crepe process, the web must be conveyed between dryer fabrics through steam heated afterdryer cans to dry the web to the required finished moisture content. After creping, the web is optionally calendered and reeled into a parent roll and ready for the converting process.

The absorbency of a conventional tissue web is low due to the web being pressed. This results in a low bulk, low void volume web where there is little space for water to be absorbed. Additionally, bulk generated by crepeing is lost when the web is wetted, further reducing bulk and void volume.

The through air drying (TAD) process is another manufacturing method for making a tissue web. The major steps of the through air drying process are stock preparation, forming, imprinting, thermal pre-drying, drying, creping, calendering (optional), and reeling the web. The stock preparation and forming steps are similar to conventional dry creping.

Rather than pressing and compacting the web, as is performed in conventional dry crepe, the web in the TAD process undergoes the steps of imprinting and thermal pre-drying. Imprinting is a step in the process where the web is transferred from a forming fabric to a structured fabric (or imprinting fabric) and subsequently pulled into the structured fabric using vacuum (referred to as imprinting or molding). This step imprints the weave pattern (or knuckle pattern) of the structured fabric into the web. This imprinting step has a tremendous effect on the softness of the web, both affecting smoothness and the bulk structure. The design parameters of the structured fabric (weave pattern, mesh, count, warp and weft monofilament diameters, caliper, air permeability, and optional over-laid polymer) are, therefore, important to the development of web softness. The manufacturing method of an imprinting/structuring fabric is similar to a forming fabric (see U.S. Pat. Nos. 3,473,576; 3,573,164; 3,905,863; 3,974,025; and 4,191,609 for examples) except for an additional step if an overlaid polymer is utilized. These types of fabrics are disclosed in, for example, U.S. Pat. Nos. 6,120,642; 5,679,222; 4,514,345; 5,334,289; 4,528,239; and 4,637,859. Essentially, fabrics produced using these methods result in a fabric with a patterned resin applied over a woven substrate. The benefit is that resulting patterns are not limited by a woven structure and can be created in any desired shape to enable a higher level of control of the web structure and topography that dictate web quality properties.

After imprinting, the web is thermally pre-dried by moving hot air through the web while it is conveyed on the structured fabric. Thermal pre-drying can be used to dry the web to over 90% solids before it is transferred to a steam heated cylinder. The web is then transferred from the structured fabric to the steam heated cylinder though a very low intensity nip (up to 10 times less than a conventional press nip) between a solid pressure roll and the steam heated cylinder. The only portions of the web that are pressed between the pressure roll and steam cylinder rest on knuckles of the structured fabric, thereby protecting most of the web from the light compaction that occurs in this nip. The steam cylinder and an optional air cap system, for impinging hot air, then dry the sheet to up to 99% solids during the drying stage before creping occurs. The creping step of the process again only affects the knuckle sections of the web that are in contact with the steam cylinder surface. Due to only the knuckles of the web being creped, along with the dominant surface topography being generated by the structured fabric, and the higher thickness of the TAD web, the creping process has much smaller effect on overall softness as compared to conventional dry crepe. After creping, the web is optionally calendered and reeled into a parent roll and ready for the converting process. Some TAD machines utilize fabrics (similar to dryer fabrics) to support the sheet from the crepe blade to the reel drum to aid in sheet stability and productivity. Creped through air dried products are disclosed in, for example, U.S. Pat. Nos. 3,994,771; 4,102,737; 4,529,480; and 5,510,002.

The TAD process is generally higher in capital costs than a conventional tissue machine due to the amount of air handling equipment needed for the TAD section with higher energy consumption from burning natural gas or other fuels for thermal pre-drying. The bulk softness and absorbency is superior to conventional paper due to the superior bulk generation via structured fabrics which creates a low density, high void volume web that retains its bulk when wetted. The surface smoothness of a TAD web can approach that of a conventional tissue web. The productivity of a TAD machine is less than that of a conventional tissue machine due to the complexity of the process and especially the difficulty in providing a robust and stable coating package on the Yankee dryer needed for transfer and creping of a delicate pre-dried web.

A variation of the TAD process where the sheet is not creped, but rather dried to up to 99% using thermal drying and blown off the structured fabric (using air) to be optionally calendered and reeled also exits. This process is called UCTAD or un-creped through air drying process. An uncreped through air dried product is disclosed in U.S. Pat. No. 5,607,551.

A new process/method and paper machine system for producing tissue has been developed by the Voith company and is being marketed under the name ATMOS. The process/method and paper machine system have several patented variations, but all involve the use of a structured fabric in conjunction with a belt press. The major steps of the ATMOS process and its variations are stock preparation, forming, imprinting, pressing (using a belt press), creping, calendering (optional), and reeling the web.

The stock preparation step is the same as that used in a conventional or TAD machine. The purpose is to prepare the proper recipe of fibers, chemical polymers, and additives that are necessary for the grade of tissue being produced, and diluting this slurry to allow for proper web formation when deposited out of the machine headbox (single, double, or triple layered) to the forming surface. The forming process can utilize a twin wire former (as described in U.S. Pat. No. 7,744,726) a Crescent Former with a suction Forming Roll (as described in U.S. Pat. No. 6,821,391), or preferably a Crescent Former (as described in U.S. Pat. No. 7,387,706). The preferred former is provided a slurry from the headbox to a nip formed by a structured fabric (inner position/in contact with the forming roll) and forming fabric (outer position). The fibers from the slurry are predominately collected in the valleys (or pockets, pillows) of the structured fabric and the web is dewatered through the forming fabric. This method for forming the web results in a unique bulk structure and surface topography as described in U.S. Pat. No. 7,387,706 (FIG. 1 through FIG. 11). The fabrics separate after the forming roll with the web staying in contact with the structured fabric. At this stage, the web is already imprinted by the structured fabric, but utilization of a vacuum box on the inside of the structured fabric can facilitate further fiber penetration into the structured fabric and a deeper imprint.

The web is now transported on the structured fabric to a belt press. The belt press can have multiple configurations. The first patented belt press configurations used in conjunction with a structured fabric can be viewed in U.S. Pat. No. 7,351,307 (FIG. 13), where the web is pressed against a dewatering fabric across a vacuum roll by an extended nip belt press. The press dewaters the web while protecting the areas of the sheet within the structured fabric valleys from compaction. Moisture is pressed out of the web, through the dewatering fabric, and into the vacuum roll. The press belt is permeable and allows for air to pass through the belt, web, and dewatering fabric, and into the vacuum roll, thereby enhancing the moisture removal. Since both the belt and dewatering fabric are permeable, a hot air hood can be placed inside of the belt press to further enhance moisture removal as shown in FIG. 14 of U.S. Pat. No. 7,351,307. Alternately, the belt press can have a pressing device arranged within the belt which includes several press shoes, with individual actuators to control cross direction moisture profile (see FIG. 28 of U.S. Pat. No. 7,951,269 or 8,118,979 or FIG. 20 of U.S. Pat. No. 8,440,055) or a press roll (see FIG. 29 of U.S. Pat. No. 7,951,269 or 8,118,979 or FIG. 21 of U.S. Pat. No. 8,440,055). The preferred arrangement of the belt press has the web pressed against a permeable dewatering fabric across a vacuum roll by a permeable extended nip belt press. Inside the belt press is a hot air hood that includes a steam shower to enhance moisture removal. The hot air hood apparatus over the belt press can be made more energy efficient by reusing a portion of heated exhaust air from the Yankee air cap or recirculating a portion of the exhaust air from the hot air apparatus itself (see U.S. Pat. No. 8,196,314). Further embodiments of the drying system composed of the hot air apparatus and steam shower in the belt press section are described in U.S. Pat. Nos. 8,402,673, 8,435,384 and 8,544,184.

After the belt press is a second press to nip the web between the structured fabric and dewatering felt by one hard and one soft roll. The press roll under the dewatering fabric can be supplied with vacuum to further assist water removal. This preferred belt press arrangement is described in U.S. Pat. Nos. 8,382,956, and 8,580,083, with FIG. 1 showing the arrangement. Rather than sending the web through a second press after the belt press, the web can travel through a boost dryer (FIG. 15 of U.S. Pat. No. 7,387,706 or 7,351,307), a high pressure through air dryer (FIG. 16 of U.S. Pat. No. 7,387,706 or 7,351,307), a two pass high pressure through air dryer (FIG. 17 of U.S. Pat. No. 7,387, 706 or 7,351,307) or a vacuum box with hot air supply hood (FIG. 2 of U.S. Pat. No. 7,476,293). U.S. Pat. Nos. 7,510, 631, 7,686,923, 7,931,781 8,075,739, and 8,092,652 further describe methods and systems for using a belt press and structured fabric to make tissue products each having variations in fabric designs, nip pressures, dwell times, etc. and are mentioned here for reference. A wire turning roll can be also be utilized with vacuum before the sheet is transferred to a steam heated cylinder via a pressure roll nip (see FIG. 2a of U.S. Pat. No. 7,476,293).

The sheet is now transferred to a steam heated cylinder via a press element. The press element can be a through drilled (bored) pressure roll (FIG. 8 of U.S. Pat. No. 8,303,773), a through drilled (bored) and blind drilled (blind bored) pressure roll (FIG. 9 of U.S. Pat. No. 8,303,773), or a shoe press (see U.S. Pat. No. 7,905,989). After the web leaves this press element to the steam heated cylinder, the % solids are in the range of 40-50% solids. The steam heated cylinder is coated with chemistry to aid in sticking the sheet to the cylinder at the press element nip and to also aid in removal of the sheet at the doctor blade. The sheet is dried to up to 99% solids by the steam heated cylinder and installed hot air impingement hood over the cylinder. This drying process, the coating of the cylinder with chemistry, and the removal of the web with doctoring is explained in U.S. Pat. Nos. 7,582,187 and 7,905,989. The doctoring of the sheet off the Yankee, creping, is similar to that of TAD with only the knuckle sections of the web being creped. Thus, the dominant surface topography is generated by the structured fabric, with the creping process having a much smaller effect on overall softness as compared to conventional dry crepe. The web is then calendered (optional,) slit, and reeled and ready for the converting process.

The ATMOS process has capital costs between that of a conventional tissue machine and TAD machine. It has more fabrics and a more complex drying system compared to a conventional machine, but less equipment than a TAD machine. The energy costs are also between that of a conventional and TAD machine due to the energy efficient hot air hood and belt press. The productivity of the ATMOS machine has been limited due to the ability of the novel belt press and hood to dewater the web and poor web transfer to the Yankee dryer, likely driven by poor supported coating packages, the inability of the process to utilize structured fabric release chemistry, and the inability to utilize overlaid fabrics to increase web contact area to the dryer. Poor adhesion of the web to the Yankee dryer has resulted in poor creping and stretch development which contributes to sheet handling issues in the reel section. The result is that the production of an ATMOS machine is currently below that of a conventional and TAD machine. The bulk softness and absorbency is superior to conventional, but lower than a TAD web since some compaction of the sheet occurs within the belt press, especially areas of the web not protected within the pockets of the fabric. Also, bulk is limited since there is no speed differential to help drive the web into the structured fabric as exists on a TAD machine. This severely limits the ability to produce a bulky, absorbent paper towel. The surface smoothness of an ATMOS web is between that of a TAD web and conventional web primarily due to the current limitation on use of overlaid structured fabrics.

The ATMOS manufacturing technique is often described as a hybrid technology because it utilizes a structured fabric like the TAD process, but also utilizes energy efficient means to dewater the sheet like the Conventional Dry Crepe process. Other manufacturing techniques which employ the use of a structured fabric along with an energy efficient dewatering process are the ETAD process and NTT process.

The ETAD process and products can be viewed in U.S. Pat. Nos. 7,339,378, 7,442,278, and 7,494,563. This process can utilize any type of former such as a Twin Wire Former or Crescent Former. After formation and initial drainage in the forming section, the web is transferred to a press fabric where it is conveyed across a suction vacuum roll for water removal, increasing web solids up to 25%. Then the web travels into a nip formed by a shoe press and backing/ transfer roll for further water removal, increasing web solids up to 50%. At this nip, the web is transferred onto the transfer roll and then onto a structured fabric via a nip formed by the transfer roll and a creping roll. At this transfer point, speed differential can be utilized to facilitate fiber penetration into the structured fabric and build web caliper. The web then travels across a molding box to further enhance fiber penetration if needed. The web is then transferred to a Yankee dryer where it can be optionally dried with a hot air impingement hood, creped, calendared, and reeled.

The ETAD process to date has been reported to have severe productivity, quality, and cost problems. Poor energy efficiency has been reported, bulk has been difficult to generate (likely due to high web dryness at the point of transfer to the structured fabric), and softness has been poor (coarse fabrics have been utilized to generate target bulk, thereby decreasing surface smoothness). Absorbency is better than ATMOS due to the ability to utilize speed differential to build higher bulk, but it is still below that of TAD which can create higher bulk with limited web compaction that would otherwise reduce void volume and thus absorbency. The installed costs of an ETAD machine are likely close to that of a TAD machine due to the large amount of fabrics and necessary supporting equipment.

The NTT process and products can be viewed in international patent application publication WO 2009/061079 A1, and U.S. Patent Application Publication Nos. US 2011/

0180223 A1 and US 2010/0065234 A1. The process has several embodiments, but the key step is the pressing of the web in a nip formed between a structured fabric and press felt. The web contacting surface of the structured fabric is a non-woven material with a three dimensional structured surface comprised of elevations and depressions of a predetermined size and depth. As the web is passed through this nip, the web is formed into the depression of the structured fabric since the press fabric is flexible and will reach down into all of the depressions during the pressing process. When the felt reaches the bottom of the depression, hydraulic force is built up which forces water from the web and into the press felt. To limit compaction of the web, the press rolls will have a long nip width which can be accomplished if one of the rolls is a shoe press. After pressing, the web travels with the structured fabric to a nip with the Yankee dryer, where the sheet is optionally dried with a hot air impingement hood, creped, calendared, and reeled.

The NTT process has low capital costs, equal or slightly higher than a conventional tissue machine. It has high production rates (equal or slightly less than a conventional machine) due to the simplicity of design, the high degree of dewatering of the web at the shoe press, and the novelty of construction of the structured fabric. The structured fabric, which will be described later in this document, provides a smooth surface with high contact area to the dryer for efficient web transfer. This high contact area and smooth surface makes the Yankee coating package much easier to manage and creates conditions beneficial for fine creping, resulting in good sheet handling in the reel section. The bulk softness of the NTT web is not equal to the ATMOS sheet as the web is highly compacted inside the structured fabric by the press felt compared to the ATMOS web. The surface smoothness is better than an ATMOS web due to the structured fabric design providing for better creping conditions. The NTT process also does not have a speed differential into the structured fabric so the bulk and absorbency remains below the potential of the TAD and ETAD processes.

The QRT process is disclosed in US 2008/0156450 A1 and U.S. Pat. No. 7,811,418. The process can utilize a twin wire former to form the web which is then transferred to a press fabric or directly formed onto a press fabric using an inverted Crescent former. The web can be dewatered across a suction turning roll in the press section before being pressed in an extended nip between the press fabric and a plain transfer belt. A rush transfer nip is utilized to transfer the web to a structured fabric in order to build bulk and mold the web before the web is transferred to the Yankee dryer and creped. This process alleviates the NTT design deficiency which lacks a rush transfer or speed differential to force the web into the structured fabric to build bulk. However, the costs, complexity, and likely productivity will be negatively affected.

Absorbent structures are also made using the Air-Laid process. This process spreads the cellulosic, or other natural or synthetic fibers, in an air stream that is directed onto a moving belt. These fibers collect together to form a web that can be thermally bonded or spray bonded with resin and cured. Compared to Wet-Laid, the web is thicker, softer, more absorbent and also stronger. It is known for having a textile-like surface and drape. Spun-Laid is a variation of the Air-Laid process, which produces the web in one continuous process where plastic fibers (polyester or polypropylene) are spun (melted, extruded, and blown) and then directly spread into a web in one continuous process. This technique has gained popularity as it can generate faster belt speeds and reduce costs.

To further enhance the strength of the absorbent structure, more than one layer of web (or ply) can be laminated together using strictly a mechanical process or preferably a mechanical process that utilizes an adhesive. It is generally understood that a multi-ply structure can have an absorbent capacity greater than the sum of the absorbent capacities of the individual single plies. Without being bound by theory, it is thought this difference is due to the inter-ply storage space created by the addition of an extra ply. When producing multi-ply absorbent structures, it is important that the plies are bonded together in a manner that will hold up when subjected to the forces encountered when the structure is used by the consumer. Scrubbing tasks such as cleaning countertops, dishes, and windows all impart forces upon the structure which can cause the structure to rupture and tear. When the bonding between plies fails, the plies move against each other, thereby imparting frictional forces at the ply interface. This frictional force at the ply interface can induce failure (rupture or tearing) of the structure, thus reducing the overall effectiveness of the product to perform scrubbing and cleaning tasks.

There are many methods used to join or laminate multiple plies of an absorbent structure to produce a multi-ply absorbent structure. One method commonly used is embossing. Embossing is typically performed by one of three processes: tip to tip (or knob to knob), nested, or rubber to steel DEKO embossing. Tip to tip embossing is illustrated by commonly assigned U.S. Pat. No. 3,414,459, while nested embossing process is illustrated in U.S. Pat. No. 3,556,907. Rubber to steel DEKO embossing comprises a steel roll with embossing tips opposed to a pressure roll, sometimes referred to as a backside impression roll, having an elastomeric roll cover wherein the two rolls are axially parallel and juxtaposed to form a nip where the embossing tips of the emboss roll mesh with the elastomeric roll cover of the opposing roll through which one sheet passes and a second unembossed sheet is laminated to the embossed sheet using a marrying roll nipped to the steel embossing roll. In an exemplary rubber to steel embossing process, an adhesive applicator roll may be aligned in an axially parallel arrangement with the patterned embossing roll, such that the adhesive applicator roll is upstream of the nip formed between the emboss and pressure roll. The adhesive applicator roll transfers adhesive to the embossed web on the embossing roll at the crests of the embossing knobs. The crests of the embossing knobs typically do not touch the perimeter of the opposing idler roll at the nip formed therebetween, necessitating the addition of a marrying roll to apply pressure for lamination.

Other attempts to laminate absorbent structure webs include bonding the plies at junction lines wherein the lines include individual pressure spot bonds. The spot bonds are formed using a thermoplastic low viscosity liquid such as melted wax, paraffin, or hot melt adhesive, as described in U.S. Pat. No. 4,770,920. Another method laminates webs of absorbent structure by thermally bonding the webs together using polypropylene melt blown fibers as described in U.S. Pat. No. 4,885,202. Other methods use meltblown adhesive applied to one face of an absorbent structure web in a spiral pattern, stripe pattern, or random pattern before pressing the web against the face of a second absorbent structure as described in U.S. Pat. Nos. 3,911,173, 4,098,632, 4,949,688, 4,891249, 4,996,091 and 5,143,776.

There is a continuing need for absorbent products that are more efficient and have increased absorbency. It would also be advantageous to develop softness, absorbency, and strength without needing high levels of machine direction ("MD") stretch.

SUMMARY OF THE INVENTION

An object of this invention is to utilize a structuring fabric on a TAD asset to produce laminated absorbent structures with previously unattainable levels of high ball burst strength, absorbency, and softness at particularly low MD stretch.

An absorbent product according to an exemplary embodiment of the present invention includes a laminate of at least two plies, wherein the absorbent product has a measured Y-Connected Area parameter greater than 20 and a Surface Channel Spacing of less than 2.5 mm. The ability to achieve these quality characteristics at low MD stretch values allows for improved productivity and lower costs. Without being bound by theory, this is because high levels of MD stretch generally require use of high levels of rush transfer (differential transfer velocity, wet crepe, wire crepe), which involves running differential speed between fabrics or machine elements in the drying section, as previously detailed in the Background. One may also choose to run high levels of dry crepe to generate MD stretch which involves running speed differential between the Yankee dryer and Reeling device, as previously detailed in the Background. Speed differential has the negative impact of reducing the speed of the production asset and thus limits productivity. Speed differential also decreases tensile strength of the product, which must be compensated for by increasing chemical strength additives or increasing mechanical fibrillation of the fibrous materials to improve bonding between fibers. Mechanical fibrillation of the fibers reduces the ability of the fibrous web to drain in the forming section, increasing drying and associated energy costs. Addition of chemical additives to improve strength also has the direct effect of increasing raw material costs. Therefore, limiting the need for generation of MD stretch provides for a productivity and cost benefit for the manufacturer. As used herein, "low MD stretch" means a stretch of about 20% to about 8%, or 15% to 8%, or 12% to 8%, or about 11% to about 8%. As used herein, "high strength" means a tensile strength of from about 370 N/m to about 550 N/m.

An absorbent product according to an exemplary embodiment of the present invention comprises a laminate of at least two plies, wherein the absorbent product has a measured Y-Connected Area parameter greater than 20, a Surface Channel Spacing of less than 2.5 mm, and a CD wet tensile strength of greater than 80 N/m.

According to an exemplary embodiment, the absorbent product has an absorbency of greater than 12.2 grams of water per gram of the absorbent product.

According to an exemplary embodiment, the absorbent product has a ball burst to MD stretch ratio of greater than 100.

According to an exemplary embodiment, the absorbent product has an absorbency to MD stretch ratio of greater than 1.2.

According to an exemplary embodiment, the absorbent product has a softness to MD stretch ratio of greater than 4.75.

According to an exemplary embodiment, (softness X ball burst)/MD stretch of the absorbent product has a value greater than 4800.

According to an exemplary embodiment, (ball burst X absorbency)/MD stretch of the absorbent product has a value greater than 1250.

According to an exemplary embodiment, (softness X absorbency)/(MD stretch) of the absorbent product has a value greater than 60.

According to an exemplary embodiment, the product comprises a surface having channels, and the channels have a channel angle between 5 and 25 degrees.

According to an exemplary embodiment, the product comprises a surface having channels, and the channels have a channel depth between 0.60 mm to 0.80 mm.

According to an exemplary embodiment, the absorbent structure is produced using a wet laid TAD process.

According to an exemplary embodiment, at least one of the at least two plies comprise cellulosic-based fibers.

According to an exemplary embodiment, the cellulosic-based fibers are selected from the group consisting of wood pulp, cannabis, cotton, regenerated or spun cellulose, jute, flax, ramie, bagasse, kenaf fibers and combinations thereof.

According to an exemplary embodiment, at least one of the at least two plies comprise synthetic fibers.

According to an exemplary embodiment, the synthetic fibers are made from a polymer selected from the group consisting of polyolefin, polyester, polypropylene and polylactic acid.

According to an exemplary embodiment, at least one of the two plies comprise synthetic fibers.

According to an exemplary embodiment, the synthetic fibers are made from a polymer selected from the group consisting of polyolefin, polyester, polypropylene and polylactic acid.

According to an exemplary embodiment, the absorbent product comprises both synthetic and cellulosic based polymers.

According to an exemplary embodiment, each of the at least two plies are embossed and the at least two plies are adhered together.

According to an exemplary embodiment, the at least two plies are adhered together with a water-soluble adhesive mixture selected from the group consisting of polyvinyl alcohol, polyvinyl acetate, starch based resins and mixtures thereof.

According to an exemplary embodiment, the water-soluble adhesive is applied to at least one ply of the at least two plies at a temperature within a range of 32 degrees C. to 66 degrees C.

According to an exemplary embodiment, the water-soluble adhesive mixture further comprises a water soluble cationic resin selected from the group consisting of polyamide-epichlorohydrin resins, glyoxalated polyacrylamide resins, polyethyleneimine resins, polyethylenimine resins, and mixtures thereof.

According to an exemplary embodiment, each of the at least two plies comprise an embossed area, wherein the embossed area occupies between approximately 5 to 15% of the total surface area of a surface of the ply.

According to an exemplary embodiment, each of the at least two plies comprise an embossed area having a surface, wherein a depth of embossment of the surface is between approximately 0.28 and 0.43 centimeters.

According to an exemplary embodiment, each of the at least two plies comprise an embossed area having a surface, wherein each embossment of the surface is between approximately 0.04 and 0.08 square centimeters in size.

According to an exemplary embodiment, the absorbent product is a paper towel, a disposable towel or wipe, a bath or facial tissue, or a nonwoven product.

A two ply disposable towel according to an exemplary embodiment of the present invention has a ball burst to MD stretch ratio of greater than 100.

A two ply disposable towel according to an exemplary embodiment of the present invention has an absorbency to MD stretch ratio of greater than 1.2

A two ply disposable towel according to an exemplary embodiment of the present invention has a softness to MD stretch ratio of greater than 4.75.

A two ply disposable towel according to an exemplary embodiment of the present invention has a (softness X ball burst)/MD stretch value greater than 4800.

A two ply disposable towel according to an exemplary embodiment of the present invention has a (ball burst X absorbency)/MD stretch value greater than 1250.

A two ply disposable towel according to an exemplary embodiment of the present invention has a Str value less than 0.15.

A two ply disposable towel according to an exemplary embodiment of the present invention has an Str value of less than 0.15 and a Channel Angle greater than 2 degrees.

According to an exemplary embodiment, a basis weight of the product is less than 43 grams per square meter.

According to an exemplary embodiment, a basis weight of the product is less than 50 grams per square meter.

According to an exemplary embodiment, the absorbent product has an Str value less than 0.15.

According to an exemplary embodiment, the absorbent product has an Str value of less than 0.15 and a Channel Angle greater than 2 degrees.

A two-ply, through air dried disposable paper towel product according to an exemplary embodiment of the present invention comprises a laminate of at least two plies, wherein the product has a measured Y-Connected Area parameter greater than 20, a Surface Channel Spacing of less than 2.5 mm, and a CD wet tensile strength of greater than 80 N/m.

According to an exemplary embodiment, the product has a ball burst to MD stretch ratio of greater than 100.

According to an exemplary embodiment, the product has an absorbency to MD stretch ratio of greater than 1.2.

According to an exemplary embodiment, (ball burst X absorbency)/MD stretch of the product has a value greater than 1250.

According to an exemplary embodiment, the paper towel product comprises a surface having channels, and the channels have a channel angle between 5 and 25 degrees.

According to an exemplary embodiment, the paper towel product comprises a surface having channels, and the channels have a channel depth between 0.60 mm to 0.80 mm.

According to an exemplary embodiment, the product has an Str value less than 0.15.

According to an exemplary embodiment, the paper towel product comprises a surface having channels, and the product has an Str value of less than 0.15 and a channel angle greater than 2 degrees.

BRIEF DESCRIPTION OF THE DRAWINGS

The features and advantages of exemplary embodiments of the present invention will be more fully understood with reference to the following, detailed description when taken in conjunction with the accompanying figures, wherein:

FIG. 7 are tables providing test result data for various attributes of specific examples of the inventive absorbent structure as compared to commercial products;

DETAILED DESCRIPTION

A laminate according to an exemplary embodiment of the present invention is composed of two or more webs/plies of absorbent structures laminated together in a face-to face relationship using a heated aqueous adhesive. The laminate exhibits previously unattainable levels of ball burst strength, absorbency, and softness at particularly low levels of MD stretch. Each ply or a single ply may have a plurality of embossments protruding outwardly from the plane of the ply towards the adjacent ply. If a three ply product is produced, the central ply may have embossments extending outwardly in both directions.

The absorbent structures can be manufactured by any Wet-Laid or Air-Laid methods. The materials used to produce the disposable structured tissue or paper towel product can be fibers in any ratio selected from cellulosic-based fibers, such as wood pulps (softwood gymnosperms or hardwood angiosperms), cannabis, cotton, regenerated or spun cellulose, jute, flax, ramie, bagasse, kenaf, or other plant based cellulosic fiber sources. Synthetic fibers, such as a polyolefin (e.g., polypropylene), polyester, or polylactic acid can also be used. Each ply of a multi-ply absorbent product of the present invention may comprise cellulosic based fibers and/or synthetic fibers. Also, any of the plies may be layered with a different fiber composition in each layer. Such a layering of fibers can be produced using a multilayered headbox on a wet laid asset, such as a TAD paper machine.

Figure 2:
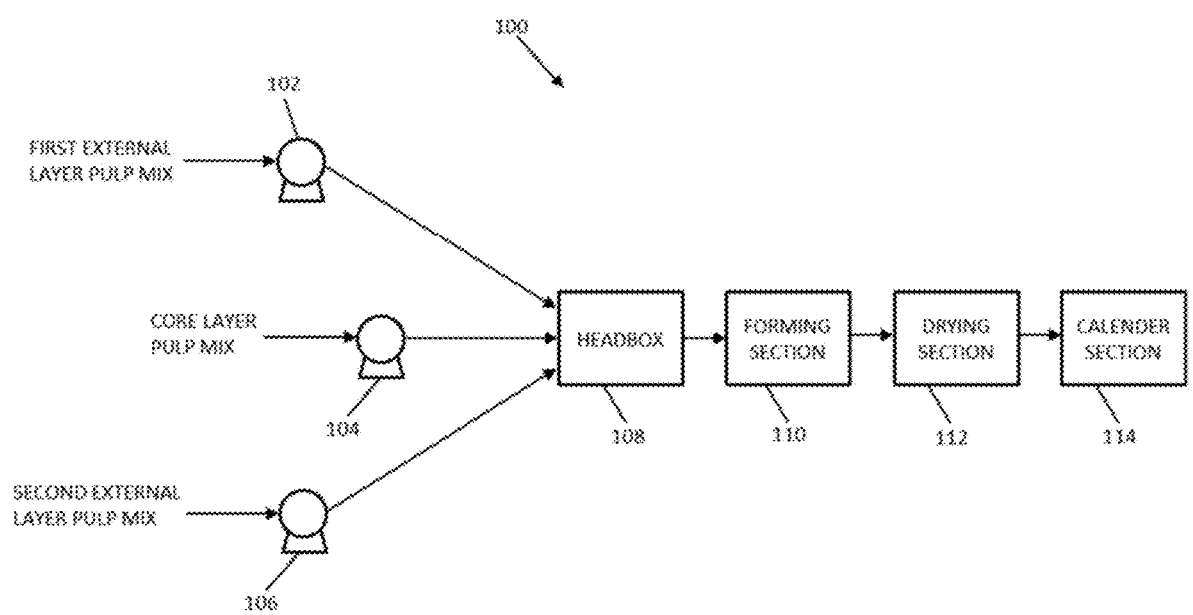
FIG. 2 is a block diagram of a system for manufacturing a ply of an absorbent structure according to an exemplary embodiment of the present invention.

FIG. 2 is a block diagram of a system for manufacturing a three-layered ply of an absorbent structure according to an exemplary embodiment of the present invention. The system 100 includes a first exterior layer fan pump 102, a core layer fan pump 104, a second exterior layer fan pump 106, a headbox 108, a forming section 110, a drying section 112 and a calendar section 114. The first and second exterior layer fan pumps 102, 106 deliver the pulp mixes of the first and second external layers to the headbox 108, and the core layer fan pump 104 delivers the pulp mix of the core layer to the headbox 108. As is known in the art, the headbox delivers a wet web of pulp onto a forming wire within the forming section 110. The wet web is then laid on the forming wire with the core layer disposed between the first and second external layers.

Wet end additives may be mixed with the pulp prior to delivery to the headbox. To impart wet strength to the absorbent structure in the wet laid process, typically a cationic strength component is added to the furnish during stock preparation. The cationic strength component can include any polyethyleneimine, polyethylenimine, polyaminoamide-epihalohydrin (preferably epichlorohydrin), polyamine-epichlorohydrin, polyamide, or polyvinylamide wet strength resin. Useful cationic thermosetting polyaminoamide-epihalohydrin and polyamine-epichlorohydrin resins are disclosed in U.S. Pat. Nos. 2,926,154, 3,049,469, 3,058,873, 3,066,066, 3,125,552, 3,186,900, 3,197,427, 3,224,986, 3,224,990, 3,227,615, 3,240,664, 3,813,362, 3,778,339, 3,733,290, 3,227,671, 3,239,491, 3,240,761, 3,248,280, 3,250,664, 3,311,594, 3,329,657, 3,332,834, 3,332,901, 3,352,833, 3,248,280, 3,442,754, 3,459,697, 3,483,077, 3,609,126, 4,714,736, 3,058,873, 2,926,154, 3,855,158, 3,877,510, 4,515,657, 4,537,657, 4,501,862, 4,147,586, 4,129,528, 5,082,527, 5,239,047, 5,318,669, 5,502,091, 5,525,664, 5,614,597, 5,633,300, 5,656,699, 5,674,358, 5,904,808, 5,972,691, 6,179,962, 6,355,137, 6,376,578, 6,429,253, 7,175,740, and 7,291,695 all of which are hereby incorporated by reference.

To impart capacity of the cationic strength resins, it is well known in the art to add water soluble carboxyl containing polymers to the furnish in conjunction with the cationic resin. Suitable carboxyl containing polymers include carboxymethylcellulose (CMC) as disclosed in U.S. Pat. Nos. 3,058,873, 3,049,469 and 3,998,690. Anionic polyacrylamide (APAM) polymers are an alternative to using carboxyl containing polymers to improve wet strength development in conjunction with cationic strength resins as disclosed in U.S. Pat. Nos. 3,049,469 and 6,939,443. If APAM is utilized rather than CMC, then cellulase enzymes can be utilized to build strength without concern for the enzymes reacting with the CMC to cleave bonds and shorten the degree of polymerization of the molecule, rendering it much less effective. The three types of cellulase enzymes that could be utilized include endo-cellulases, exo-cellulases, and cellobiase cellulases.

To impart dry strength, polymers belonging to any one of the following three categories can be mixed in the furnish separately or in combinations thereof: (i) polymers capable of only forming hydrogen bonds to cellulose fibers such as starch or certain polyacrylamides, (ii) polymers capable of additionally forming ionic bonds to cellulose fibers such as higher cationic polyvinylamines or (iii) polymers capable of covalently bonding to the cellulose fibers such as glyoxylated polyacrylamide. The polymers can be synthetic or natural. The polymers can be cationic, or anionic, or amphoteric. The polymers can be copolymers, linear or branched structures. In addition to amphoteric starch, suitable dry strength additives may include but are not limited to starch and starch derivatives, glyoxalated polyacrylamide, carboxymethylcellulose, guar gum, locust bean gum, cationic polyacrylamide, polyvinyl alcohol, anionic polyacrylamide, styrene-butadiene copolymers, vinyl acetate polymers, ethylene-vinyl acetate copolymers, vinyl chloride polymers, vinylidene chloride polymers, vinyl chloride-vinylidene copolymers, acrylo-nitrile copolymers, acrylic emulsions, styrene-butadiene latexes, elastomeric latex emulsions, ethylene-acrylic copolymers or combinations thereof. Exemplary materials for use as dry strength additives include those disclosed in U.S. Pat. Nos. 3,556,932, 3,556,933, 4,035,229, 4,129,722, 4,217,425, 5,085,736, 5,320,711, 5,674,362, 5,723,022, 6,224,174, 6,245,874, 6,749,721, 7,488,403, 7,589,153, 7,828,934, 7,897013, 4,818,341, 4,940,514, 4,957,977, 6,616,807, 7,902,312, and 7,922,867 all of which are hereby incorporated by reference in their entirety.

After formation in the forming section 110, the partially dewatered web is transferred to the drying section 112. Within the drying section 112, the tissue may be dried using through air drying processes which involve the use of a structured fabric. In an exemplary embodiment, the tissue is dried to a moisture content of about 7 to 20% using a through air drier manufactured by Valmet Corporation, of Espoo, Finland. In another exemplary embodiment, two or more through air drying stages are used in series. However, it should be emphasized that this is only one of various methods of manufacturing an absorbent structure to be used in manufacturing the laminate of the present invention.

Figure 1:
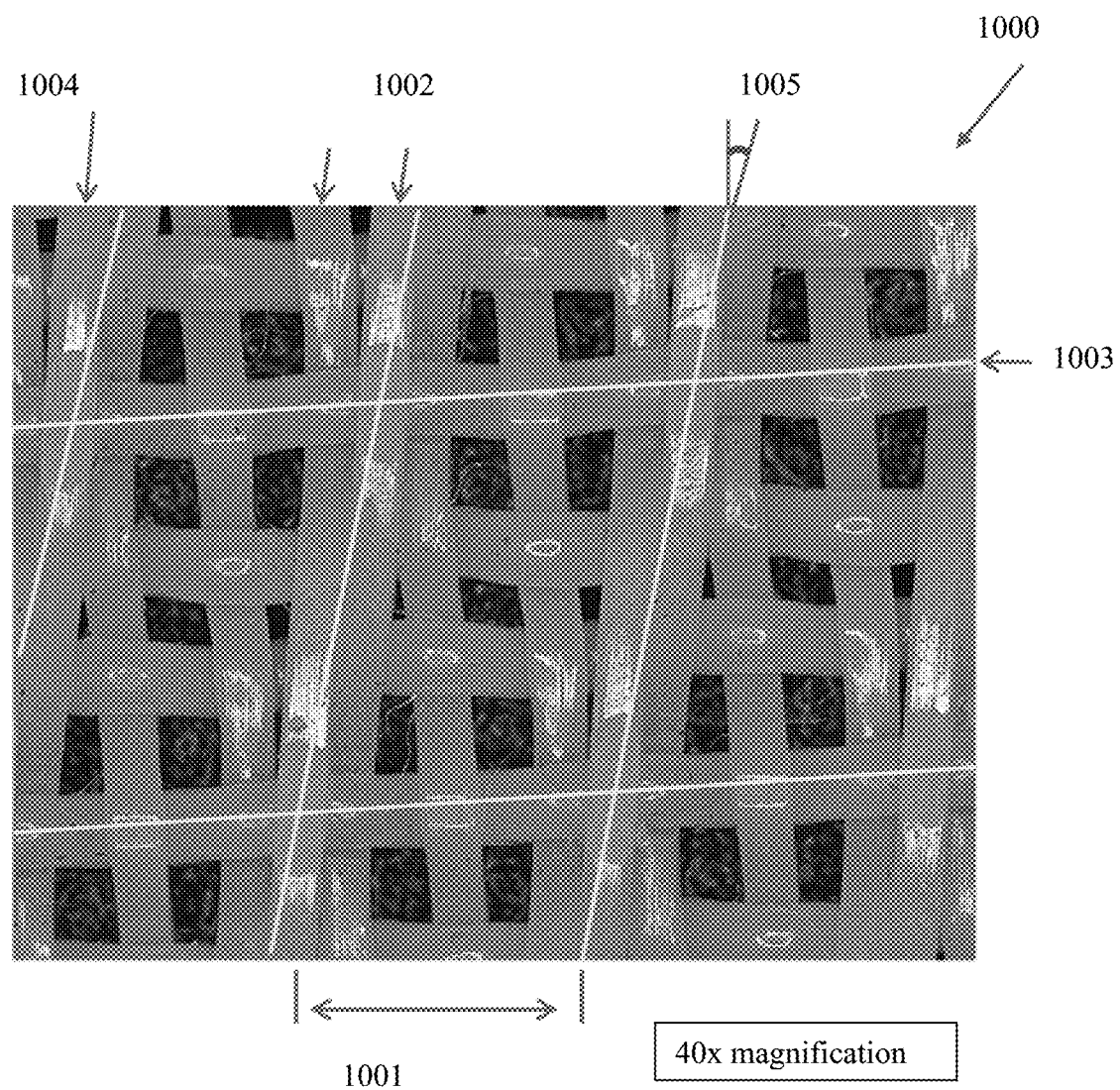
FIG. 1 is a micrograph of a TAD fabric used to form an absorbent structure according to an exemplary embodiment of the present invention.

In an exemplary embodiment, the tissue of the present invention is patterned during the through air drying process using a TAD fabric. FIG. 1 shows a TAD fabric, generally designated by reference number 1000, that may be used in a TAD drying process according to an exemplary embodiment of the present invention. The TAD fabric 1000 has the following attributes:

Round warp yarn 1004 in the machine direction with a diameter in the range of 0.35 mm to 0.45 mm or flat rectangular warp yarn with a range of 0.29-0.39 mm height by 0.35-0.52 mm width;

Round weft yarn 1003 in the cross machine direction with a diameter in the range of 0.40 to 0.60 mm diameter;

A weave pattern with the warp yarn passing over five consecutive weft yarns then under the subsequent weft yarn, over the subsequent weft yarn, under the subsequent weft yarn, over the subsequent weft yarn, under the subsequent weft yarn then repeating the entire sequence over again throughout the fabric, thereby resulting in an MD warp pattern of 5×1×1×1×1×1. An example of a suitable fabric that has this attribute as well as the other attributes listed here is available through Voith and is a 10× single layer (1 MD×1 CD yarns) fabric design with 10 shed weave pattern;

The warp yarns pair up side by side to create a larger bundled warp 1002 equivalent to between 0.70 mm to 1.3 mm in warp yarn width to create a near continuous angled warp float or knuckle with deep and continuous valleys or channels 1001 between the knuckles for sheet bulk development. As used herein, a channel is the depressed region between ridges. Ridges are the top plane of compressed fiber. The measured depth of the fabric channels 1001 is in the range of 0.60 mm-0.80 mm;

The measured warp yarn angle 1005 is between 5 to 25 degrees;

The mesh (warp filaments per cross direction distance) is 17 filaments per centimeter or less with a count (weft filaments per machine direction distance) of 13 filaments per centimeter or less. Fabrics with 6×2×3×2 (1 MD yarn over 6 CD yarns under 2 CD yarns over 3 CD yarns under 2 CD yarns and repeats) with 13 count mesh may also be used. Any fabric with first warp line of 5 or more may be used to create the long warp knuckle (for example as shown in U.S. Pat. Nos. 5,832,962; 5,925,217; 6,039,838, the contents of which are incorporated herein by reference in their entirety).

Figure 4:
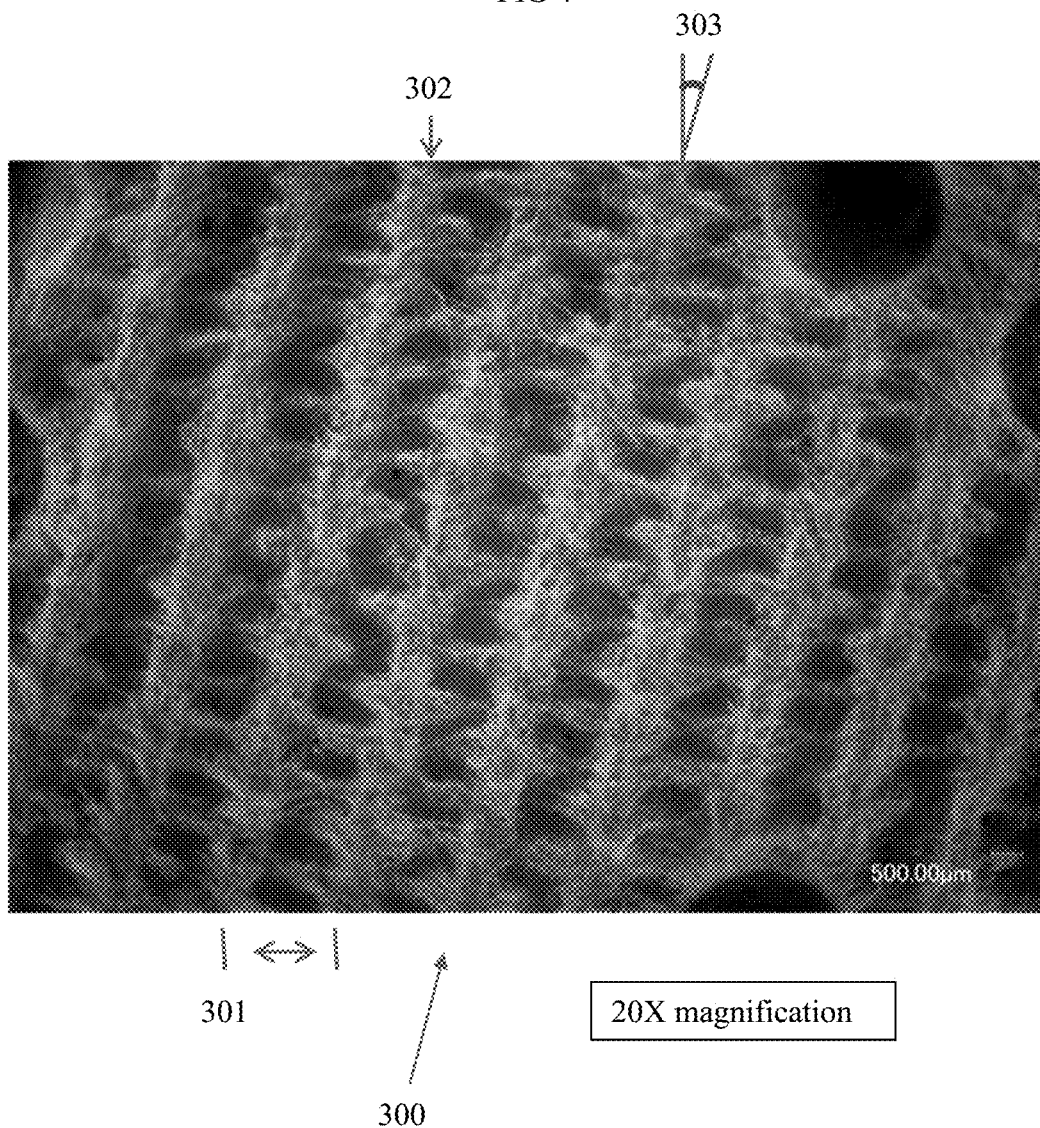
FIG. 4 is a micrograph of an absorbent structure according to an exemplary embodiment of the present invention.

FIG. 4 shows an absorbent structure, generally designated by reference number 300, according to an exemplary embodiment of the present invention made using a TAD fabric having the above-listed attributes. The absorbent structure 300 includes substantially continuous channels 301 and ridges 302. More specifically, the channels 301 formed in a surface of the absorbent structure 300 extend across the surface in an unbroken manner. The weave pattern raises and bundles pairs of the warp monofilaments in nearly continuous or unbroken lines such that the sheet/web is compressed along these lines when pressed between the Yankee and pressure roll. Surprisingly, these continuous compressed portions or ridges have shown to increase the strength of the sheet compared to conventional woven structuring fabrics. This allows lower basis weights to be utilized to achieve higher strength products without having to over-mechanically refine or add excessive strength chemistry, which could destroy absorbency (if wet strength resins are utilized) of the structure and both negatively affect softness.

Additionally, the channels provide for greater absorbency, thus reducing the need to utilize excessive rush transfer to increase bulk and provide absorbency. As widely known in the art, a differential velocity transfer (wire crepe, wet crepe, rush transfer) can be utilized between a carrier fabric and transfer fabric, as taught in U.S. Pat. No. 4,440,597. More commonly, in the TAD process the carrier fabric is termed the inner wire, and the transfer fabric is termed the structuring fabric. When running the inner wire at a higher velocity than the structuring fabric, the embryonic web, which is low consistency (typically in the low 20% solids range), is forced further into the structuring fabric to develop higher bulk (and thus absorbency) than would otherwise be realized without the differential velocity transfer. Increasing velocity differential has the negative affect of decreasing the web tensile and burst strength. In order to regain lost strength, refining of the fibers must be increased to enhance fiber to fiber bonding, or increased chemical strength additives must be utilized, which negatively affect softness and drives up energy and chemical costs. Additionally, differential velocity transfer reduces speed, thus leading to loss of production. Speed differential in the dry end or dry crepe results in similar negative effects as wet crepe.

The level of wire crepe or dry crepe used is typically proportional to the MD stretch (i.e., MD stretch increases with the amount of wire crepe used) although MD stretch can be influenced by other factors such as fiber type, structuring fabric design, and creping conditions at the Yankee dryer. The parameter of MD stretch itself can be important as higher MD stretch typically increases tensile and ball burst strength and even softness, if wire crepe is not used to generate the increase. However, the compressed portions provided by the bundled warp in accordance with exemplary embodiments of the present invention give near continuous ridges of strength to improve ball burst strength, and thus wire crepe can be eliminated or minimized. The ridges also provide for continuous zones of creping to improve sheet flexibility and overall softness. The depth and width of the channels 301 formed in the absorbent structure 300 using the TAD fabrics having the above-mentioned attributes are in the range of 0.60-0.80 mm, with angles of the ridges 303 between 5 to 25 degrees measured from the true machine direction.

Figure 12:
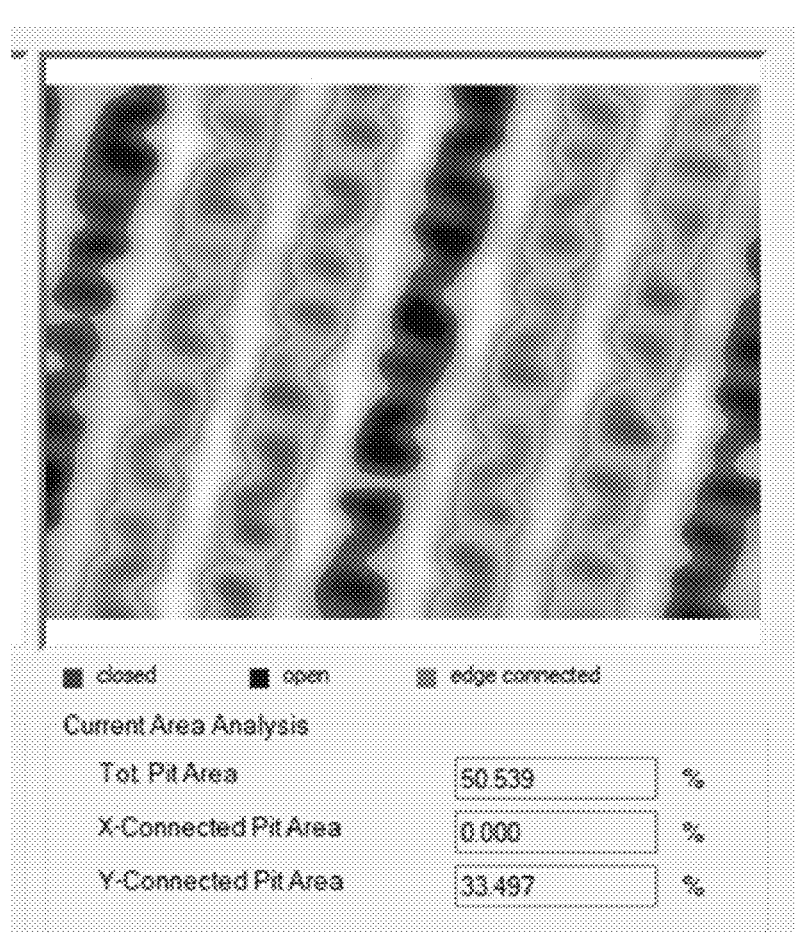
FIG. 12 is a micrograph of an absorbent structure showing Y-Connected Area.

The absorbent structure produced in accordance with exemplary embodiments of the present invention exhibits surface attributes including Y Connected Area (or Y Connected Pit Area) of greater than 20%, or between 8% and 50%, or 15% to 50%, or 20% to 50%, and Surface Channel Spacing (Ssm-x) of less than 2.5 mm, or from 0.4 to 1.2 mm, 1.2 mm to 4.0 mm, or from 1.2 mm to 3.0 mm, or from 1.2 mm to 2.5 mm. Y Connected Area is shown in FIG. 12 and is defined as the percent compressed portions of the web, that run in the machine direction (Y direction) of the web, the entire distance across the sample field of view of 12.1 mm (X direction) by 9.1 mm (Y direction). Without being bound by theory, it is believed higher Y Connected Area, up to approximately 50%, would be desirable for building these compressed zones or ridges for improved strength, softness, and absorbency. With greater than 50% Y Connected Area, the compressed ridges would begin to become wide enough where wicking or capillary action begins to decrease liquid uptake into the absorbent structure to reduce overall absorbency. Capillary action works when the channels are sufficiently small that the combination of surface tension of the liquid and adhesive forces between the liquid and fibrous material of the absorbent structure act to propel the liquid even in opposition to external forces such as gravity. Additionally, a Y Connected Area greater than 50% could produce a product with such a high number of compressed ridges that the product would feel flat and not provide a preferred bulky and soft feel in the hand of the consumer. It is also believed that keeping small spacing between the compressed ridges (Ssm-x value) would produce an absorbent structure with a finer surface that feels smoother and softer in the hands of the consumer, and thus a low Surface Channel Spacing value below 2.5 mm is preferred.

Use of the inventive structuring or TAD fabric allows for a high absorbency disposable towel product to be produced with high strength (due to the near continuous warp monofilament design previously mentioned) and absorbency (due to the channels and ridges in the product), and high softness due to the absence or minimization of wire crepe and continuous zones of creped product improving flexibility. All of this can be accomplished without excessive amounts of basis weight which can increase absorbency, softness, and strength but dramatically increase raw material costs. The lamination process improves the strength further by tightly adhering multiple plies of the web to form a laminate.

Figure 5:
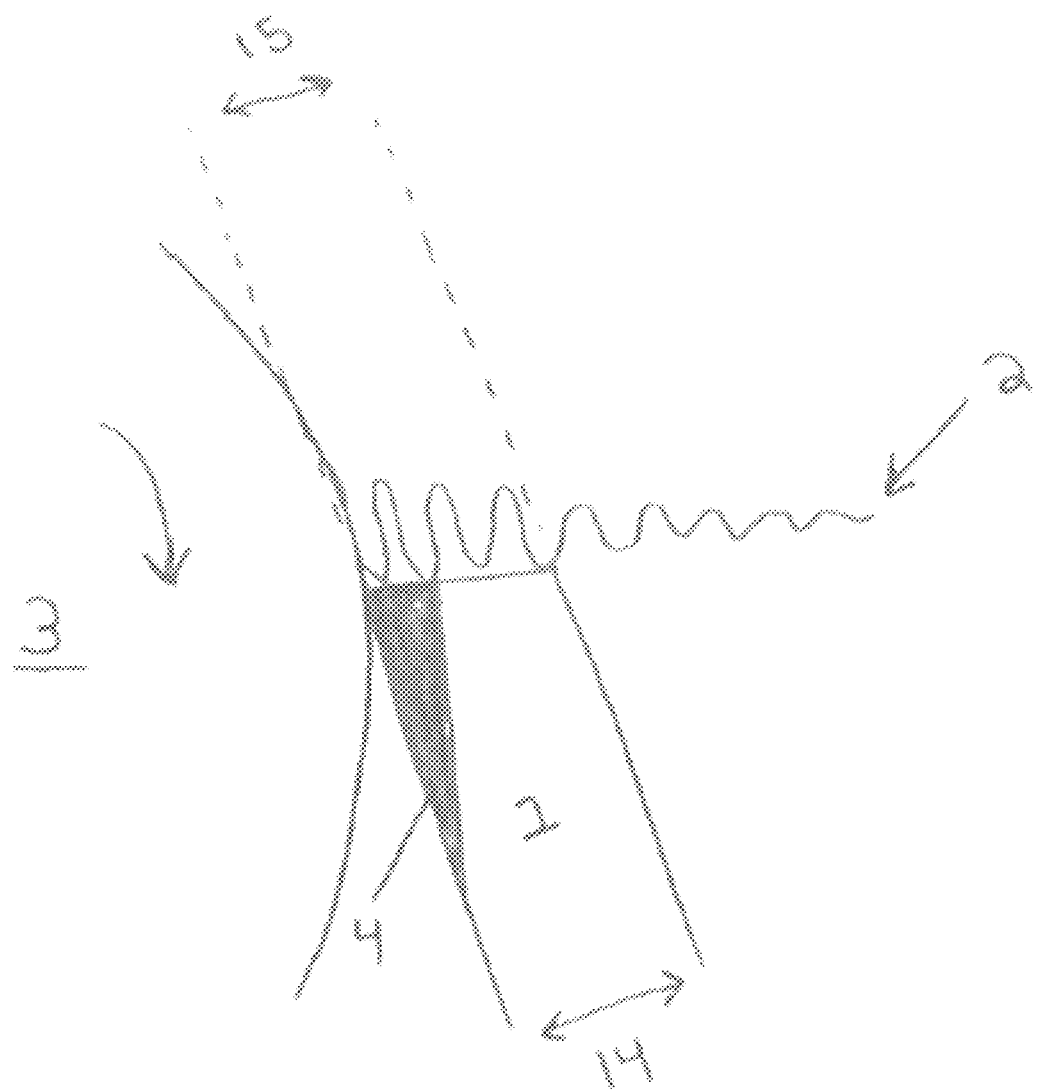
FIG. 5 showing a conventional crepe blade.
Figure 6:
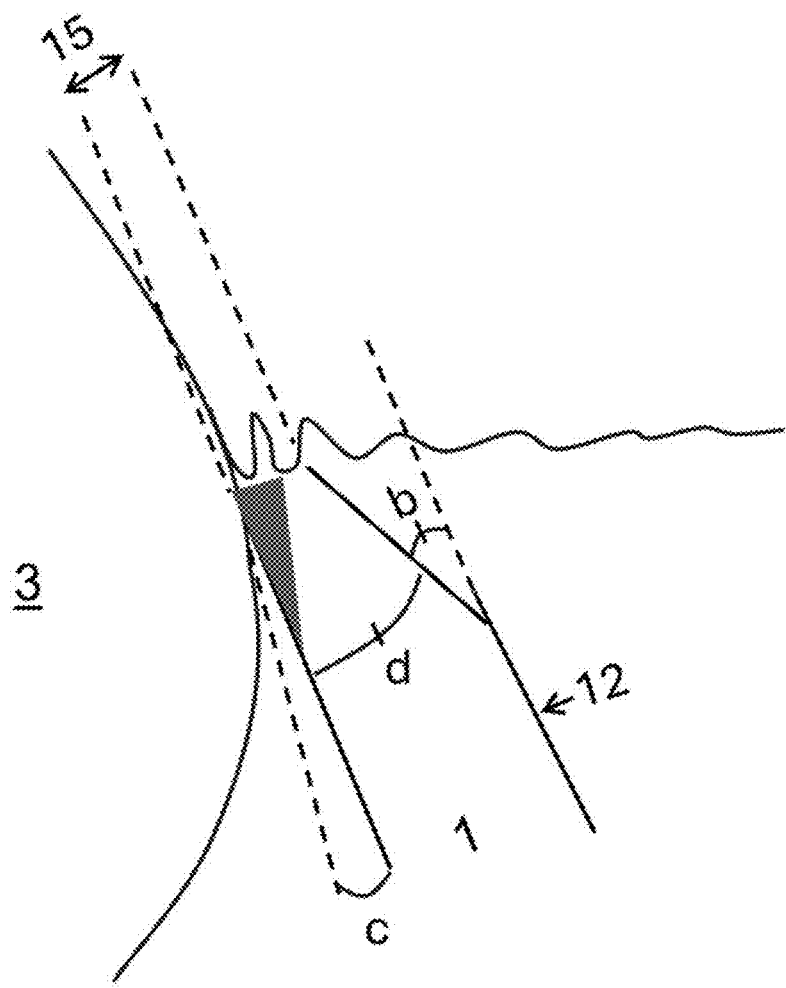
FIG. 6 shows a crepe blade according to an exemplary embodiment of the present invention.

After the through air drying stage, the absorbent structure in accordance with exemplary embodiments of the present invention may be further dried in a second phase using a Yankee drying drum. In an exemplary embodiment, a creping adhesive is applied to the drum prior to the absorbent structure contacting the drum. The absorbent structure adheres to the drum and is removed using a wear resistant coated creping blade with a creping shelf of 0.5 mm or less. The creping doctor set up angle is preferably 10 to 35 degrees, while the blade bevel is preferably 55 to 80 degrees. To further illustrate the creping process, FIG. 5 shows a conventional art creping blade application wherein a creping blade 1 is pressed against a steam heated drum 3 in order to crepe a tissue web 2. The blade may be provided with a wear resistant material 4 at the blade tip. The distance of the creping shelf 15 is the same as the thickness of the creping blade 14. In comparison, as shown in FIG. 6, in accordance with exemplary embodiments of the creping process used for the present invention, the distance of the creping shelf 15 has been reduced to 0.5 mm or less by beveling the non-contacting face of the blade 12. The angle of the bevel b is selected to obtain the desired creping shelf distance. Without being bound by theory, it has been discovered that distance of the creping shelf can influence the properties of the absorbent structure including tensile, bulk, and softness since the distance of the creping shelf directly influences the contact time between the blade and web and thus the forces imparted to the web by the blade. In an exemplary embodiment a 25 degree blade set up angle (c), which is measured from a normal line at the contact point between the blade tip and the drum to the face of the creping blade, a wear resistant coated tip blade with an 80 degree blade bevel (d), and a 0. 5 mm creping shelf distance is utilized.

The wear resistant material is suitably a ceramic material, a cermet material, or a carbide material. For example, the wear resistant material may be selected from metal oxides, ceramic materials, silicates, carbides, borides, nitrides, and mixtures thereof. Particular examples of suitable wear resistant materials are alumina, chromia, zirconia, tungsten carbide, chromium carbide, zirconium carbide, tantalum carbide, titanium carbide, and mixtures thereof. The wear-resistant material may be applied by thermal spraying, physical vapor deposition, or chemical vapor deposition.

According to an exemplary embodiment of the invention, a ceramic coated creping blade is used to remove the absorbent structure from the Yankee drying drum. Ceramic coated creping blades result in reduced adhesive build up and aid in achieving higher run speeds. Without being bound by theory, it is believed that the ceramic coating of the creping blades provides a less adhesive surface than metal creping blades and is more resistant to edge wear that can lead to localized spots of adhesive accumulation. The ceramic creping blades allow for a greater amount of creping adhesive to be used, which in turn provides improved sheet integrity and faster run speeds.

The absorbent structure may then be calendered in a subsequent stage within the calendar section as shown in FIG. 2. According to an exemplary embodiment, calendaring may be accomplished using a number of calendar rolls that deliver a calendering pressure in the range of 0-100 pounds per linear inch (PLI). In general, increased calendering pressure is associated with reduced caliper and a smoother tissue surface. Additionally, gap calendaring can be utilized where there exists a gap between the top and bottom calendar roll that is equal to or less than the thickness of the absorbent structure passing between these rolls.

In addition to the use of wet end additives, the absorbent structure in accordance with exemplary embodiments of the present invention may also be treated with topical or surface deposited additives. Examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agent include the organo-reactive polydimethyl siloxane ingredients, including amino functional polydimethyl siloxane, zinc stearate, aluminum stearate, sodium stearate, calcium stearate, magnesium stearate, spermaceti, and steryl oil.

To enhance the strength and absorbency of the absorbent structure, multiple plies are laminated together using, for example, a heated adhesive, as described below with respect to FIG. 3. The adhesive mixture is preferably water soluble and includes a mixture of one or more adhesives, one or more water soluble cationic resins and water. The one or more adhesives are present in an amount of 1% to 10% by weight of the mixture and may be selected from polyvinyl alcohol, polyvinyl acetate, starch based resins and/or mixtures thereof. A water soluble cationic resin may be present in an amount of up to 10% by weight of the mixture and may include polyamide-epichlorohydrin resins, glyoxalated polyacrylamide resins, polyethyleneimine resins, polyethylenimine resins, and/or mixtures thereof. The remainder of the mixture is composed of water.

Figure 3:
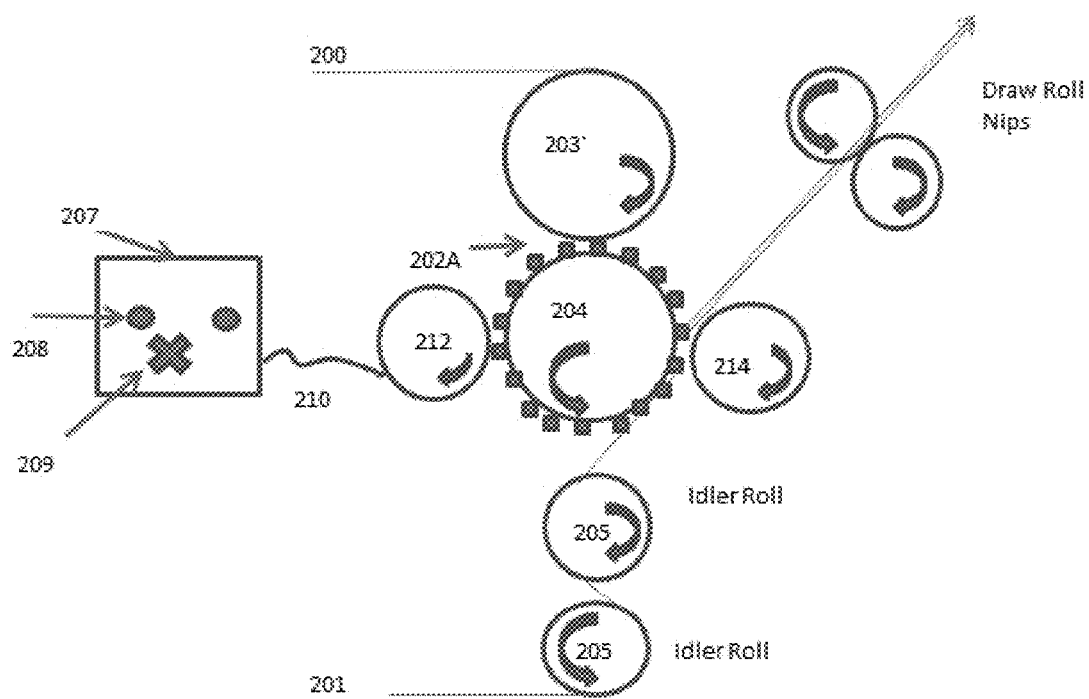
FIG. 3 is a block diagram of a system for laminating plies according to an exemplary embodiment of the present invention.

FIG. 3 shows an apparatus for manufacturing a laminate of two plies of a structured paper towel or tissue that are joined to each other, with the Yankee side surface of each ply facing the exterior of the laminated structure, in accordance with an exemplary embodiment of the present invention. The process illustrated in FIG. 3 is referred to as dynamic embossment knock out (DEKO) embossing. As shown, two webs 200, 201 of single ply towel which may be manufactured, for example, according to the methods described herein are plied together with only one web being embossed. A first web 200 is fed through a nip 202A formed by rubber covered pressure roll 203 and embossing roll 204 (also known as a patterned roll). The embossing roll 204 which rotates in the illustrated direction, impresses an embossment pattern onto the web 200 as it passes through the nip between emboss roll 204 and pressure roll 203. A second web 201 is fed across two idler rolls 205 and joins with web 200 at the nip between the embossing roll 204 and marrying roll 214. The idlers rolls can be driven. Alternatively, the emboss section may not have idler rolls in which case the second web would travel directly to the nip between the embossing roll 204 and marrying roll 214.

After being embossed, the top ply may have a plurality of embossments protruding outwardly from the plane of the ply towards the adjacent ply. The emboss roll 204 has embossing tips or embossing knobs that extend radially outward from the rolls to make the embossments. In the illustrated embodiment, embossing is performed by the crests of the embossing knobs applying pressure onto the rubber pressure roll and compressing and deflecting web 200 into the pressure roll 203 and thereby imparting the imprint of the embossments into the paper web.

An adhesive applicator roll 212 is positioned upstream of emboss roll 204 and is aligned in an axially parallel arrangement with the emboss roll. The heated adhesive is fed from an adhesive tank 207 via a conduit 210 to applicator roll 212. The applicator roll 212 transfers heated adhesive to an interior side of embossed ply 200 to adhere the at least two plies 200, 201 together, wherein the interior side is the side of ply 200 that comes into a face-to-face relationship with ply 201 for lamination. The adhesive is applied to the ply at the crests of the embossing knobs on embossing roll 204. In a preferred exemplary embodiment, the adhesive is applied only to the tips of the embossments in the ply 200.

Notably, in exemplary embodiments of the present invention, the adhesive is heated and maintained at a desired temperature utilizing, in embodiments, the adhesive tank 207, which is an insulated stainless steel tank that may have heating elements 208 that are substantially uniformly distributed throughout the interior heating surface. In this manner, a large amount of surface area may be heated relatively uniformly. Generally, an adjustable thermostat may be used to control the temperature of the adhesive tank 207. It has been found advantageous to maintain the temperature of the adhesive at between approximately 32 degrees C. (90 degrees F.) to 66 degrees C. (150 degrees F.), and preferably to around 49 degrees C. (120 degrees F.). In addition, in embodiments, the tank has an agitator 209 to ensure proper mixing and heat transfer.

After the application of the embossments and the adhesive, a marrying roll 214 is used to apply pressure for lamination. The marrying roll 214 forms a nip with the embossing roll 204. The marrying roll 214 is generally needed to apply pressure to the two webs to allow the adhesive on the crests of the embossments on web 200 to contact and adhere to and laminate to web 201.

The specific pattern that is embossed on the absorbent products is significant for achieving the enhanced scrubbing resistance of the present invention. In particular, it has been found that the embossed area on the top ply should cover between approximately 5 to 15% of the surface area. Moreover, the size of each embossment should be between approximately 0.04 to 0.08 square centimeters. The depth of the embossment should be within the range of between approximately 0.127 and 0.43 centimeters (0.050 and 0.170 inches) in depth.

The emboss pattern used is also important to provide adequate area for bonding the laminate while limiting absorbency loss, as the laminated areas will absorb less than the non-laminated areas. In a preferred exemplary embodiment, the embossed area on any ply should be in the range of 5 to 15%. The size of each embossment is preferably in the range of 0.04 to 0.08 square centimeters. The depth of each embossment is preferably in the range of 0.05 and 0.170 inches.

The combination of the structuring fabric and lamination method provides a disposable towel product with a unique combination of high levels of softness, ball burst strength, and absorbency with low levels of MD stretch.

Ball Burst Testing

The Ball Burst of a 2-ply tissue web was determined using a Tissue Softness Analyzer (TSA), available from emtec Electronic GmbH of Leipzig, Germany using a ball burst head and holder. A punch was used to cut out five 100 cm² round samples from the web. One of the samples was loaded into the TSA, with the embossed surface facing down, over the holder and held into place using the ring. The ball burst algorithm was selected from the list of available softness testing algorithms displayed by the TSA. The ball burst head was then pushed by the TSA through the sample until the web ruptured and calculated the grams force required for the rupture to occur. The test process was repeated for the remaining samples and the results for all the samples were averaged.

Stretch & MD, CD, and Wet CD Tensile Strength Testing

An Instron 3343 tensile tester, manufactured by Instron of Norwood, MA, with a 100N load cell and 25.4 mm rubber coated jaw faces, was used for tensile strength measurement. Prior to measurement, the Instron 3343 tensile tester was calibrated using Operator's Guide M10-16279-EM Revision D. After calibration, 8 strips of 2-ply product, each 2.54 cm by 10.16 cm (one inch by four inches), were provided as samples for each test. When testing MD (Material Direction) tensile strength, the strips were cut in the MD direction. When testing CD (Cross Direction) tensile strength, the strips were cut in the CD direction. One of the sample strips was placed in between the upper jaw faces and clamp, and then between the lower jaw faces and clamped with a gap of 5.08 cm (2 inches) between the clamps. A test was run on the sample strip to obtain tensile strength and stretch. The test procedure was repeated until all the samples were tested. The values obtained for the eight sample strips were averaged to determine the tensile strength of the tissue. When testing CD wet tensile, the strips were placed in an oven at 105 degrees Celsius for 5 minutes and saturated with 75 microliters of deionized water evenly across the cross direction at the center of the strip immediately prior to pulling the sample.

Basis Weight

Using a dye and press, six 76.2 mm by 76.2 mm square samples were cut from a 2-ply product being careful to avoid any web perforations. The samples were placed in an oven at 105 deg C. for 5 minutes before being weighed on an analytical balance to the fourth decimal point. The weight of the sample in grams was divided by $(0.0762 \text{ m})^2$ to determine the basis weight in grams/m².

Caliper Testing

A Thwing-Albert ProGage 100 Thickness Tester, manufactured by Thwing Albert of West Berlin, NJ was used for the caliper test. The Thickness Tester was used with a 2 inch diameter pressure foot with a preset loading of 0.93 grams/square inch. Eight 100 mm×100 mm square samples were cut from a 2-ply product. The samples were then tested individually and the results were averaged to obtain a caliper result for the base sheet.

Softness Testing

Softness of a 2-ply tissue web was determined using a Tissue Softness Analyzer (TSA), available from Emtec Electronic GmbH of Leipzig, Germany. The TSA comprises a rotor with vertical blades which rotate on the test piece to apply a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB V² rms. The stiffness of the sample is also calculated as the device measures deformation of the sample under a defined load. The stiffness value (D) is expressed as mm/N. The device also calculates a Hand Feel (HF) number with the value corresponding to a softness as perceived when someone touches a tissue sample by hand (the higher the HF number, the higher the softness). The HF number is a combination of the TS750, TS7, and stiffness of the sample measured by the TSA and calculated using an algorithm, which also requires the caliper and basis weight of the sample. Different algorithms can be selected for different facial, toilet, and towel paper products. Before testing, a calibration check should be performed using "TSA Leaflet Collection No. 9" (dated 2016 May 10) available from Emtec. If the calibration check demonstrates a calibration is necessary, "TSA Leaflet Collection No. 10" is followed for the calibration procedure available from emtec dated 2015 Sep. 9.

A punch was used to cut out five 100 cm$^2$ round samples from the web. One of the samples was loaded into the TSA, clamped into place (outward facing or embossed ply facing upward), and the TPII algorithm was selected from the list of available softness testing algorithms displayed by the TSA. After inputting parameters for the sample (including caliper and basis weight), the TSA measurement program was run. The test process was repeated for the remaining samples and the results for all the samples were averaged and the average HF number recorded.

Method for Data Capture for Surface Analysis Including Y Connected Area and Surface Channel Spacing Images used to calculate the Y Connected Pit Area and Surface Channel Spacing Along X Axis (Ssm-x) were acquired using a Keyence Model VR-3200 G2 3D Macroscope equipped with motorized XY stage, VR-3000K controller, VR-H2VE version 2.2.0.89 Viewer software, and VR-H2AE Analyzer software. After following calibration procedures, as outlined by the Keyence equipment manual from 2016, the instrument was configured for 25× magnification. The following was selected on the viewer software: "Expert mode" for viewer capture method, and "normal" capture image type for Camera settings. For Measurement settings: "Glare removal" mode was selected with "both sides" measurement direction, Adjust brightness for measurement set to "Auto," and Display missing and saturated data turned "ON." This results in a "3D surface data set" which is approximately 12.1 mm (X direction) by 9.1 mm (Y direction) with a pixel size of approximately 7.9 microns.

On paper towel, the top surface of the top ply is the surface of interest, avoiding any and all emboss points if possible. Embossments are not representative of the majority of the surface and should be avoided during the "3D surface data set" acquisition. A representative paper towel sheet was torn from the center of a roll and held in place using weights. When tearing the sheet from the roll, care was taken so as to not alter the topographic features of the sample. The machine direction (MD) of the sample was placed in the Y axis (front to back on the stage as seen from operator perspective in front of the system) while the cross direction (CD) was placed in the X axis (left to right on the stage as seen from operator perspective in front of the system). Care was taken to ensure no creases or folds were present in the sample and the sample was not under any MD or CD directional stress. The image was autofocused prior to capturing the "3D surface data set". Ten of these "3D surface data sets" were collected for each sample.

"3D surface data sets" were exported from the analyzer software with image type "Height" and the "No Skip" option selected. These "3D surface data sets" were analyzed with OmniSurf3D (v1.01.052) software, available from Digital Metrology Solutions, Inc. of Columbus, IN, USA for parameter calculations.

Figure 9:
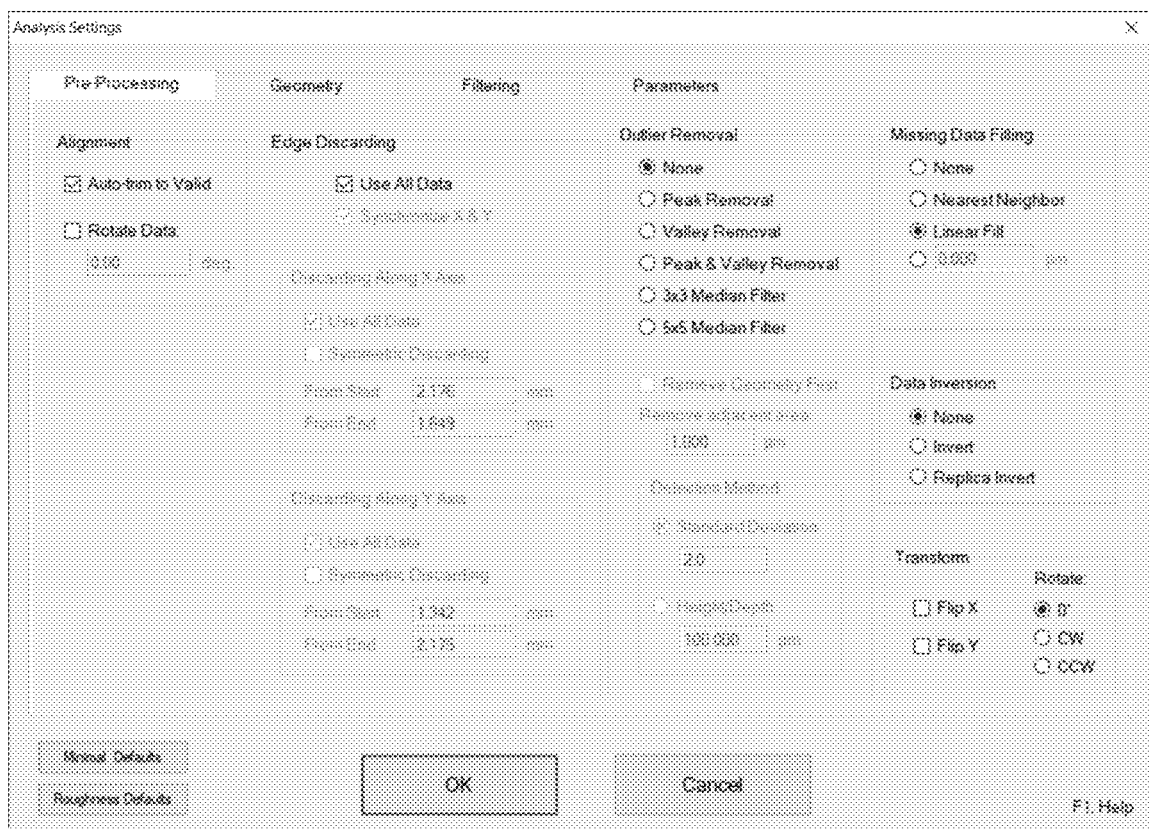
FIG. 9 shows pre-processing settings used on a Keyence Macroscopic to measure Y-Connected Area and Surface Channel Spacing.
Figure 10:
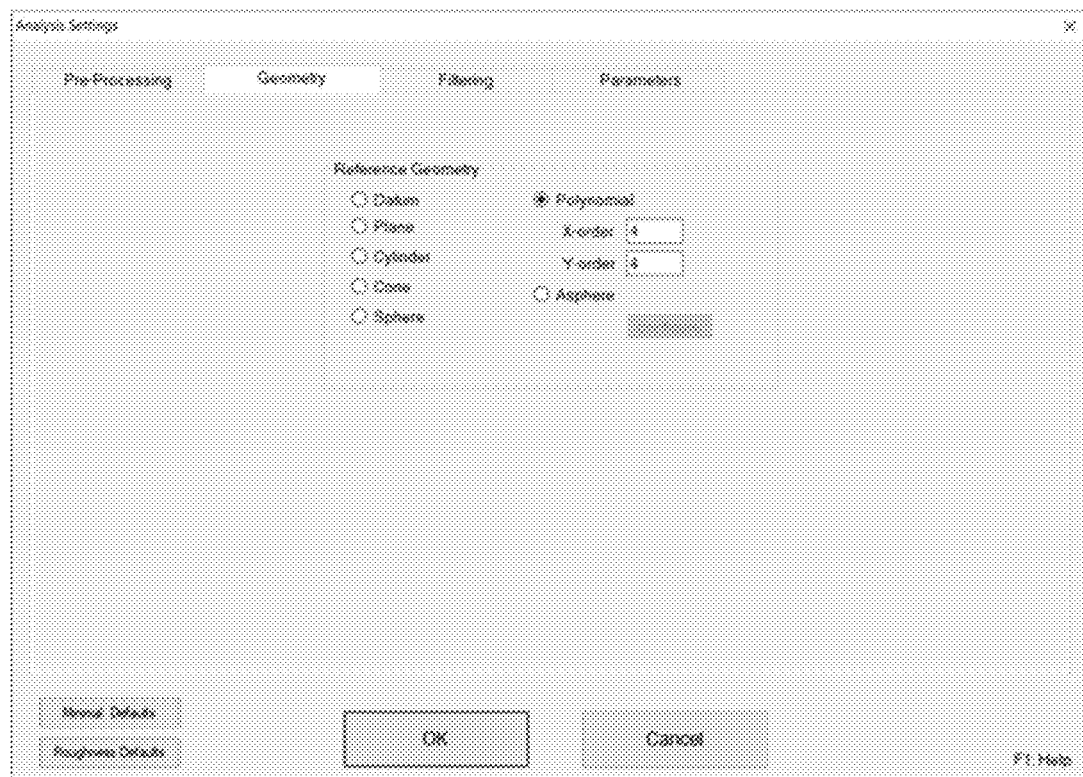
FIG. 10 shows geometry settings used on a Keyence Macroscopic to measure Y-Connected Area and Surface Channel Spacing.
Figure 11:
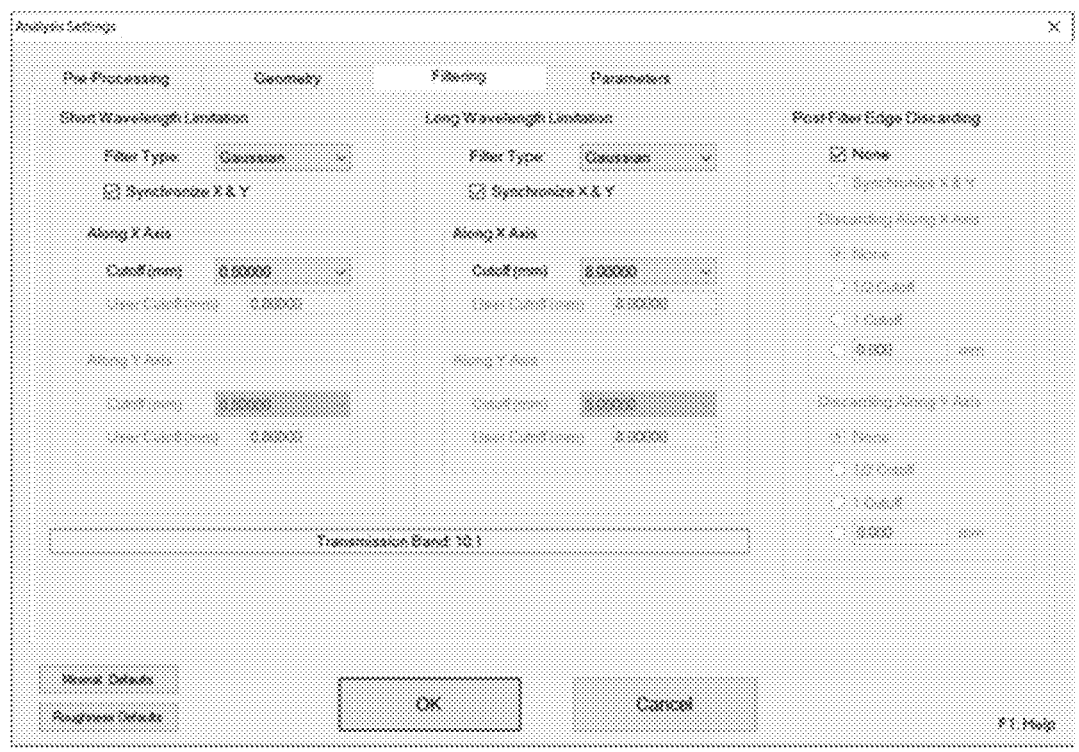
FIG. 11 show filtering setting used on a Keyence Macroscopic to measure Y-Connected Area and Surface Channel Spacing.

The OmniSurf 3D settings were set as follows:
Preprocessing:
Alignment—Auto-trim to Valid
Edge Discarding—Use all data,
Outlier Removal—None
Missing Data Filling—Linear Fill
Data Inversion—None
Transform
Rotate—0
Geometry:
Reference Geometry—Polynomial
X-order=4
Y-order=4
Filtering:
Short Wavelength Limitation—Gaussian/0.80000 mm/Sync X&Y
Long Wavelength Limitation-Gaussian/8.00000 mm/Sync X&Y
Post-Filter Edge Discarding—None The Pre-processing settings are shown in FIG. 9. The Geometry Settings are shown in FIG. 10. The Filtering settings are shown in FIG. 11.

The settings described above were chosen to remove underlying curvatures in the samples. The desired exported file from the Keyence software was opened in the Omnisurf 3D software. In the "analysis" menu, "parameters" was selected, and Ssm-x was chosen. The user clicked "OK" and the Ssm-x value was recorded. For Y-Connectivity Pit Area, the "Pit/Porosity Analysis" tool was selected in the "Tools" menu. "Height Above Meanline" was chosen and the height was set to 0. The user clicked "Apply" and the Y-Connectivity Pit Area was recorded.

Method for Determining Texture Aspect Ratio

Figure 13:
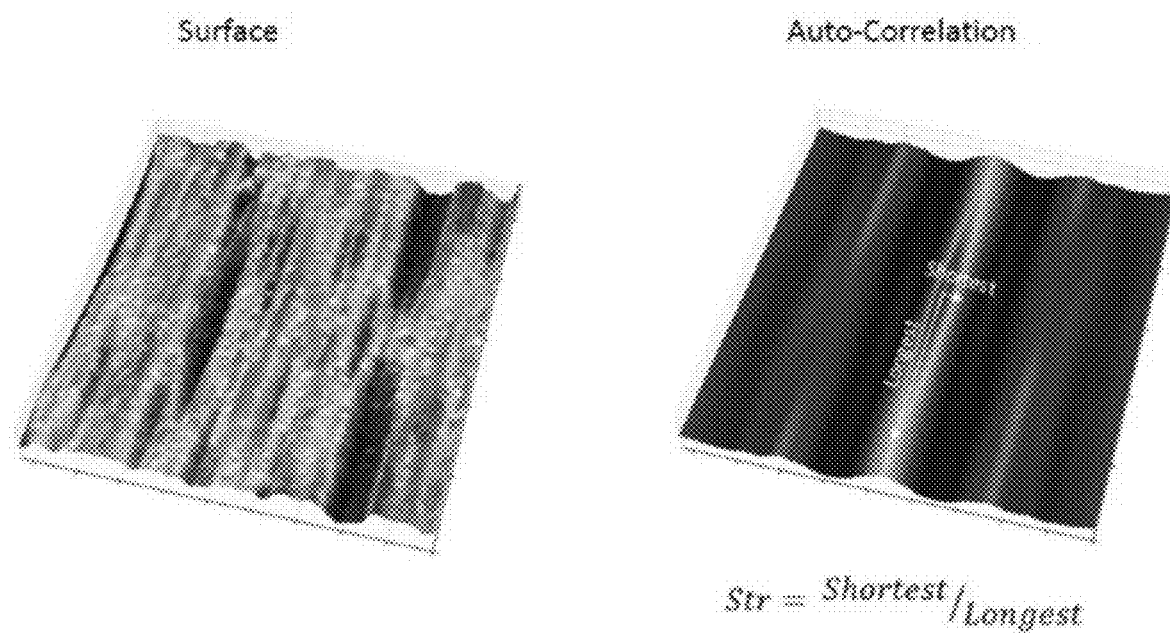
FIG. 13 are micrographs of an absorbent structure showing texture aspect ratio.

The towel of the present invention exhibits a unique texture aspect ratio (Str) as defined in ISO 25178-2 (2012) and shown in FIG. 13 which is a parameter that defines the ratio of the shortest autocorrelation length to the longest autocorrelation length across the surface of an object.

In the case of paper towel or tissue, the product will have longer and narrower ridge-like structures across the surface of the product and, therefore, a lower Str parameter. Without being bound by theory, a tissue or towel product with a lower Str parameter would therefore, have ridges that should be able to remove and retain a greater amount of contamination. In the case of a tissue product, this would allow for improved enhanced cleaning of a contaminated surface such as a countertop. FIG. 4 shows an example of a surface with a low Str value and the ridge-like structures that are developed.

Images used to calculate the Str parameter were acquired using a Keyence Model VR-3200 G2 3D Macroscope equipped with motorized XY stage, VR-3000K controller, VR-H2VE version 2.2.0.89 Viewer software, and VR-H2AE Analyzer software. After following calibration procedures, as outlined by The Keyence equipment manual from 2016, the instrument was configured for 25× magnification. The following was selected on the viewer software: "Expert mode" for viewer capture method, and "normal" capture image type for Camera settings. For Measurement settings: "Glare removal" mode was selected with "both sides" measurement direction, Adjust brightness for measurement set to "Auto," and Display missing and saturated data turned "ON." This results in a "3D surface data set" which is approximately 12.1 mm (X direction) by 9.1 mm (Y direction) with a pixel size of approximately 7.9 microns.

On paper towel, the bottom surface of the bottom ply is the surface of interest. This surface is chosen due to the lack of embossments. Embossments are not representative of the majority of the surface and should be avoided during the "3D surface data set" acquisition. A representative paper towel sheet was torn from the center of a roll and held in place using weights. When tearing the sheet from the roll, care was taken so as to not alter the topographic features of the sample. The machine direction (MD) of the sample was placed in the Y axis (front to back on the stage as seen from operator perspective in front of the system) while the cross direction (CD) was placed in the X axis (left to right on the stage as seen from operator perspective in front of the system). Care was taken to ensure no creases or folds were present in the sample and the sample was not under any MD or CD directional stress. The image was autofocused prior to capturing the "3D surface data set". Ten of these "3D surface data sets" were collected at random positions on the towel sheet.

"3D surface data sets" were exported from the analyzer software with image type "Height" and the "No Skip" option selected. These "3D surface data sets" were analyzed with OmniSurf3D (v1.01.052)) software, available from Digital Metrology Solutions, Inc. of Columbus, IN, USA for parameter calculations.

The OmniSurf3D settings are set as follows:
Preprocessing:
Alignment—Auto-trim to Valid
Edge Discarding—Use all data,
Outlier Removal—None
Missing Data Filling—Linear Fill
Data Inversion—None
Transform
Rotate—0
Geometry:
Reference Geometry—Polynomial
X-order=4
Y-order=4
Filtering:
Short Wavelength Limitation—Gaussian/0.80000 mm/Sync X&Y
Long Wavelength Limitation—Gaussian/8.00000 mm/Sync X&Y
Post-Filter Edge Discarding—None The Str parameter is calculated for each of the 10 "3D surface data sets". The mean of these 10 Str values is reported as the "average Str" of the towel sample. The standard deviation (SD) is also reported.

Method for Determining Channel Depth

The fabric pocket depth was measured using a Keyence Model VR-3200 G2 3D Macroscope equipped with motorized XY stage, VR-3000K controller, VR-H2VE version 2.2.0.89 Viewer software, and VR-H2AE Analyzer software. After following calibration procedures, as outlined by The Keyence equipment manual from 2016, the instrument was set to the "High Mag Cam" at 40× magnification. The following was selected on the viewer software: "Expert mode" for viewer capture method, and "depth comp" capture image type for Camera settings. For Measurement settings: "Superfine" mode was selected with "both sides" measurement direction. Adjust brightness for measurement set to "Auto," and Display missing and saturated data turned "ON." This results in a "3D surface data set" which is approximately 7.6 mm (X direction) by 5.7 mm (Y direction).

Figure 15:
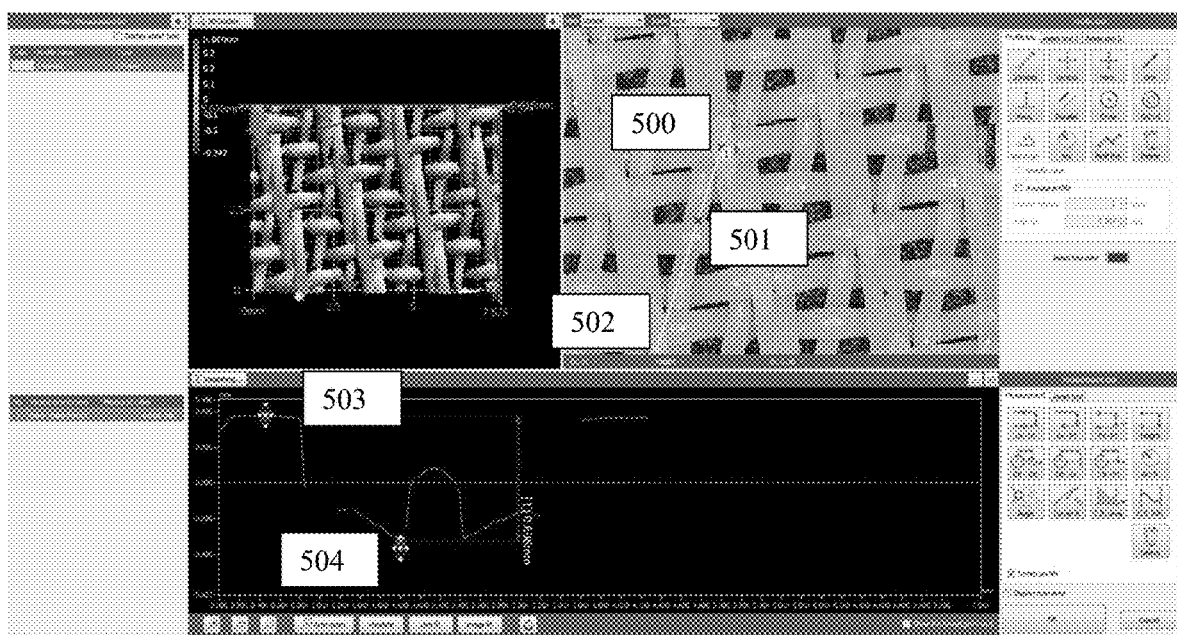
FIG. 15 shows images from a Keyence Macroscopic illustrating measurement of channel depth.

A 6 in. by 6 in. section of the structured or TAD fabric was placed on the sample stage and held in place by weights to assure the sample was resting completely flat. Once the sample was in focus using the "Focus adjustment" arrows in the Viewer Software, a measurement was taken. In the Analyzer Software, the "Profile" tool was selected to draw a "2 Point" profile line from one of the highest points of the fabric (reference number 500), across the lowest MD yarn and CD yarn intersection (reference number 501) of the fabric, to another high point of the fabric (reference number 502) as shown in FIG. 15. The lowest MD yarn and CD yarn intersection is believed to be the lowest point of the pocket. A side view of the profile line is shown in the bottom window. Using the "Point to Point (Pt-Pt) Vertical distance" measurement tool in the side view window of the profile line, the vertical distance was measured from the highest point (reference number 503) to the lowest point (reference number 504).

Method for Determining Channel Angle

Figure 14:
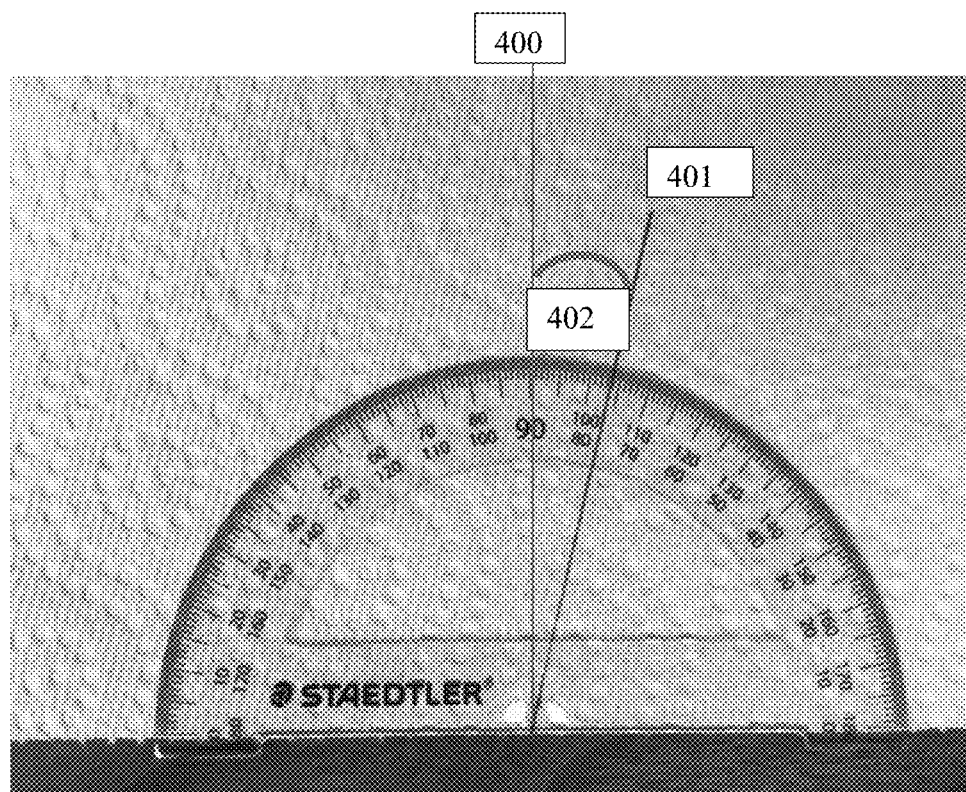
FIG. 14 is a photo showing measurement of channel angle of an absorbent structure.

One sample sheet was torn from a rolled paper product along the perforation. A ruler and pen were used to draw a line that traveled along one pocket channel and did not enter any neighboring channels as shown by reference number 401 in in FIG. 14. A protractor was placed on top of the sample and positioned so the bottom of the protractor was overlaid and parallel to the perforated edge of the sample. The line representing the channel angle was measured and recorded using the protractor. 90 degrees was subtracted from the measured angle and the absolute value was taken to determine the channel angle. As shown in FIG. 14, reference number 402 shows a measured angle of 103.7 degree, for example. After subtracting 90 degrees from this value and taking the absolute value, a channel angle of 13.7 degrees is calculated from True Machine Direction (reference number 400).

Absorbency Testing

Figure 8:
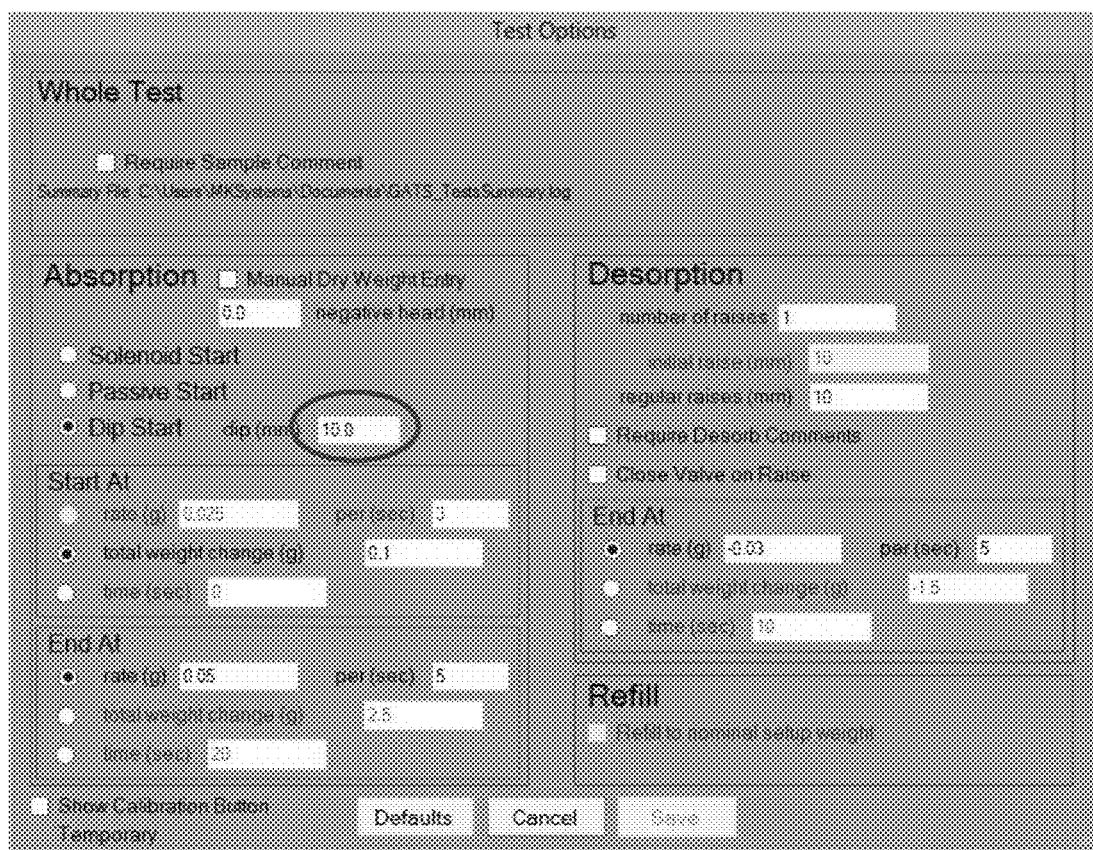
FIG. 8 show selections made within a user interface of a GATS machine to measure absorbency.

An M/K GATS (Gravimetric Absorption Testing System), manufactured by M/K Systems, Inc., of Peabody, MA, USA was used to test absorbency using MK Systems GATS Manual from Mar. 30, 2016. The following steps were followed during the absorbency testing procedure:

Turn on the computer and the GATS machine. The main power switch for the GATS is located on the left side of the front of the machine and a red light will be illuminated when power is on. Ensure the balance is on. A balance should not be used to measure masses for a least 15 minutes from the time it is turned on. Open the computer program by clicking on the "MK GATS" icon and click "Connect" once the program has loaded. If there are connectivity issues, make sure that the ports for the GATS and balance are correct, the GATS being attached to "COM7" and the balance being attached to "COMB". These can be seen in Full Operational Mode. The upper reservoir of the TAS needs to be filled with Deionized water. The Velmex slide level for the wetting stage needs to be set at 4.5 cm. If the slide is not at the proper level, movement of it can only be accomplished in Full Operational Mode. Click the "Direct Mode" check box located in the top left of the screen to take the system out of Direct Mode and put into Full Operational Mode. The level of the wetting stage is adjusted in the third window down on the left side of the software screen. To move the slide up or down 1 cm at a time, the button for "1 cm up" and "1 cm down" can be used. If a millimeter adjustment is needed, press and hold the shift key while toggling the "1 cm up" or "1 cm down" icons. This will move the wetting stage 1 mm at a time. Click the "Test Options" Icon and ensure the following set-points are inputted: "Dip Start" selected with 10.0 mm inputted under "Absorption", "Total Weight change (g)" selected with 0.1 inputted under "Start At", Rate (g) selected with 0.05 inputted per (sec) 5 under "End At" on the left hand side of the screen, "Number of Raises" 1 inputted and regular raises (mm) 10 inputted under "Desorption", Rate (g) selected with −0.03 inputted per 5 sec under "End At" on the right hand side of the screen. These selections are also shown in FIG. 8. The water level in the primary reservoir needs to be filled to the operational level before any series of testing. This involves the reservoir and water contained in it to be set to 580 grams total mass. Click on the "Setup" icon in the box located in the top left of the screen. The reservoir will need to be lifted to allow the balance to tare or zero itself. The feed and draw tubes for the system are located on the side and extend into the reservoir. Prior to lifting the reservoir, ensure that the top hatch on the balance is open to keep from damaging the top of the balance or the elevated platform that the sample is weighed on. Open the side door of the balance to lift the reservoir. Once the balance reading is stable a message will appear to place the reservoir again. Ensure that the reservoir doesn't make contact with the walls of the balance. Close the side door of the balance. The reservoir will need to be filled to obtain the mass of 580 g. Once the reservoir is full, the system will be ready for testing. The system is now ready to test. Obtain a minimum number of four 113 mm diameter circular samples. Three will be tested with one extra available. Enter the pertinent sample information in the "Enter Material ID." section of the software. The software will automatically date and number the samples as completed with any used entered data in the center of the file name. Click the "Run Test" icon. The balance will automatically zero itself. Place the pre-cut sample on the elevated platform, making sure the sample isn't in contact with the balance lid. Once the balance load is stabilized, click "Weigh". Move the sample to the wetting stage, centered with the emboss facing down. Ensure the sample doesn't touch the sides and place the cover on the sample. Click "Wet the Sample". The wetting stage will drop the preset distance to initiate absorption. The absorption will end when the rate of absorption is less than 0.05 grams/5 seconds. When absorption stops, the wetting stage will rise to conduct desorption. Data for desorption isn't recorded for tested sample. Remove the saturated sample and dry the wetting stage prior to the next test. Once the test is complete, the system will automatically refill the reservoir. Record the data generated for this sample. The data that is traced for each sample is the dry weight of the sample (in grams), the normalized total absorption of the sample reflected in grams of water/gram of product, and the normalized absorption rate in grams of water per second. Repeat procedure for the three samples and report the average total absorbency.

The towel of the present invention exhibits a unique Y Connectivity Pit Area of greater than 20, or between 30 to 45, with Surface Channel Spacing of less than 2.5 mm, or between 1.8 to 2.4 mm. Additionally, the channel depth may range from 0.60 mm to 0.80 mm. Without being bound by theory, a tissue or towel product with a high Y Connectivity Pit Area parameter would have ridges that should be able to remove and retain a greater amount of contamination. In the case of a disposable towel, the product would be able to provide enhanced cleaning of a contaminated surface such as a countertop.

The following example illustrates advantages of the present invention.

Example 1

Paper towel made on a wet-laid asset with a three layer headbox was produced using the through air drying method. The imprinting or structuring fabric had a warp monofilament of 0.35 mm diameter with a weft monofilament of 0.50 mm diameter with the weave pattern described herein. The mesh was 16 filaments/cm while the count was 12 filaments/cm. The Air Permeability was 650 cfm, 1.14 mm in caliper, with a knuckle surface that was sanded to impart 16% contact area with the Yankee dryer. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The tissue was produced with 50% NBSK and 50% eucalyptus in the Yankee layer with 80% NBSK, 20% eucalyptus in the core and air layer. Polyamine polyamide-epichlorohydrin resin at 12.0 kg/ton (dry basis) and 4.0 kg/ton (dry basis) of carboxymethylcellulose were added to each of the three layers to generate permanent wet strength. Additionally, 1.5 kg/ton of polyvinyl amine was added to each layer to aid in fiber retention with 2.0 kg of amphoteric starch for additional strength generation. The NBSK was un-refined. The Yankee and TAD section speed was 1200 m/min running 0% slower than the forming section. The Reel section was additionally running 1% faster than the Yankee. Sheet moisture dropped from 77% to 20% in the TAD section, requiring 22 m$^3$ of natural gas per bone dry ton of paper towel produced.

Figure 16:
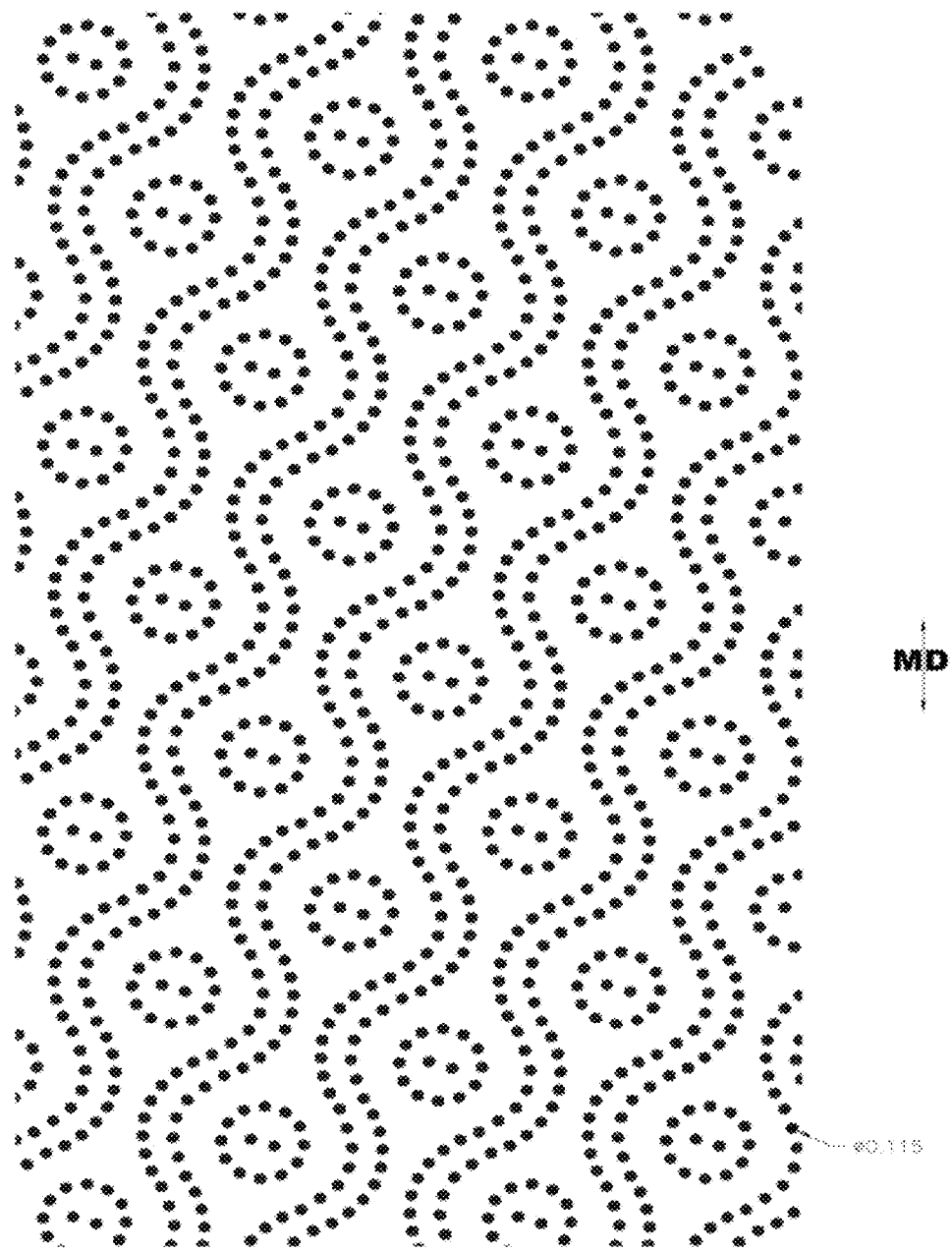
FIG. 16 shows an emboss pattern according to an exemplary embodiment of the present invention.

The towel was then plied together using the method described herein using a steel emboss roll with the pattern shown in FIG. 16 and approximately 7% polyvinyl alcohol based adhesive heated to 120 deg F. A rolled 2-ply product with DEKO emboss was produced with a core diameter of 43 mm, 135 sheets and a roll diameter of 148 mm, with each sheet having a length of 6.0 inches and a width of 11 inches. The 2-ply tissue product had the following product attributes: Basis Weight 39.0 g/m$^2$, Caliper 713 mm, MD tensile of 443 N/m, CD tensile of 318 N/m, a ball burst of 896 grams force, an MD stretch of 7.4%, a CD stretch of 11.4%, a CD wet tensile of 89.9 N/m, an absorbency of 12.9 g/g, and a TSA softness of 58.8. The Y Connected Area was 34.5% and Ssm-x was 2.04 mm. The Str value was 0.0974 with a standard deviation of 0.00191. The channel angle was about 13.7 deg, using a fabric with a channel depth of 0.698 mm. FIG. 4 shows an image magnified at 40 times of the surface of the disposable towel produced in this Example. The ridges formed in the disposable towel results in the high Y-Connectivity parameter.

Example 2

Paper towel made on a wet-laid asset with a three layer headbox was produced using the through air drying method. The imprinting or structuring fabric used a weave pattern described herein, 12.0 yarn/cm Mesh and Count, 0.35 mm diameter warp monofilament, 0.50 mm diameter weft monofilament, 1.29 mm caliper, 670 cfm and a knuckle surface that was sanded to impart 12% contact area with the Yankee dryer. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The tissue was produced with 16.7% eucalyptus, 50% northern bleached softwood kraft (NBSK) fibers, and 33% re-pulped "broke" fibers which are a combination of eucalyptus and NBSK fibers reused from off-grade towel parent rolls. The dry layer fiber was 50% eucalyptus, 50% NBSK while the core and air layer were 50% NBSK, 50% broke. Polyamine polyamide-epichlorohydrin resin at 8.5 kg/ton (dry basis) and 2.8 kg/ton (dry basis) of anionic polyacrylamide were added to each of the three layers to generate permanent wet strength. The core layer had 2 kg/ton of starch added. The NBSK was refined separately before blending into the layers using 45 kwh/ton on two conical refiners connected in series. The Yankee and TAD section speed was 1450 m/min running 11% slower than the forming section. Sheet moisture dropped from 77% to 20% in the TAD section, requiring 24 m^3 of natural gas per bone dry ton of paper towel produced.

The towel was then plied together using DEKO emboss the method described herein using a steel emboss roll with the pattern shown in FIG. 16 and 7% polyvinyl alcohol based adhesive heated to 120 deg F. A rolled 2-ply product was produced with a 43 mm diameter core, 146 sheets and a roll diameter of 147 mm, with each sheet having a length of 6.0 inches and a width of 11 inches. The 2-ply tissue product had the following product attributes: Basis Weight 42.7 g/m$^2$, Caliper 0.831 mm, MD tensile of 403 N/m, CD tensile of 412 N/m, a ball burst of 1087 grams force, an MD stretch of 10%, a CD stretch of 8%, a CD wet tensile of 123 N/m, an absorbency of 14.2 g/g, and a TSA softness of 48.3. The Y-Connected Area was 21.5% with a Ssm-x of 2.15 mm. The Str value was 0.1022 with a standard deviation of 0.00389. The channel angle was about 16.5 deg, using a fabric with a channel depth of 0.752 mm.

Comparative Example

Paper towel made on a wet-laid asset with a three layer headbox was produced using the through air drying method. A TAD fabric design named Prolux 593 supplied by Albany (216 Airport Drive Rochester, NH 03867 USA Tel: +1.603.330.5850) was utilized. The fabric had a 45 yarns/inch Mesh and 27 yarns/inch Count, a 0.35 mm diameter warp monofilament, a 0.55 mm diameter weft monofilament, a 1.89 mm caliper, with a 670 cfm and a knuckle surface that is sanded to impart 15% contact area with the Yankee dryer. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The tissue was produced with 50% NBSK and 50% eucalyptus in the yankee layer with 80% NBSK, 20% eucalyptus in the core and air layer. Polyamine polyamide-epichlorohydrin resin at 12.0 kg/ton (dry basis) and 4.0 kg/ton (dry basis) of carboxymethylcellulose were added to each of the three layers to generate permanent wet strength. Additionally, 1.5 kg/ton of polyvinyl amine was added to each layer to aid in fiber retention with 2.0 kg of amphoteric starch for additional strength generation. The NBSK was refined separately before blending into the layers using 100 kwh/ton on one conical refiner. The Yankee and TAD section speed was 1200 m/min running 17% slower than the forming section. The Reel section was additionally running 1% faster than the Yankee. Sheet moisture dropped from 77% to 20% in the TAD section, requiring 28 m^3 of natural gas per bone dry ton of paper towel produced.

The towel was then plied together using the DEKO method described herein using a steel emboss roll with the pattern shown in FIG. 16 and 7% polyvinyl alcohol based adhesive heated to 120 deg F. A rolled 2-ply product was produced with a 43 mm core, 146 sheets and a roll diameter of 147 mm, with each sheet having a length of 6.0 inches and a width of 11 inches. The 2-ply tissue product had the following product attributes: Basis Weight 39.9 g/m$^2$, Caliper 0.880 mm, MD tensile of 429 N/m, CD tensile of 491 N/m, a ball burst of 1098 grams force, an MD stretch of 21.4%, a CD stretch of 13.3%, a CD wet tensile of 146 N/m, an absorbency and 15.9 g/g, and a TSA softness of 44.4. The Y Connected Area was 0% with a Ssm-x of 3.06 mm. The Str value was 0.6856 with a standard deviation of 0.0414. There was no channel angle in the paper derived from using this fabric, but rather discrete pockets or discontinuous depressions imprinted that match the pattern of the structuring fabric.

FIG. 7 shows the surface parameters and physical properties of the Comparative Example and various commercially available disposable towel products compared to the inventive product.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

The invention claimed is:

1. A two-ply, through air dried creped paper towel product, comprising:
    a laminate of two plies;
    a surface having a first edge and a second edge opposite to the first edge, the surface having a plurality of first channels and corresponding first ridges that extend in a continuous manner across the surface in a first direction from the first edge to the second edge of the surface in an unbroken manner and a plurality of second ridges that extend perpendicularly from the plurality of first ridges, the plurality of first ridges and the plurality of second ridges forming a plurality of pockets within the plurality of first channels, the first channels having a channel depth between 0.60 mm to 0.80 mm,
    wherein the product has a measured Y-Connected Area parameter greater than 20%, and a Surface Channel Spacing of less than 2.5 mm,
        wherein the product has an absorbent capacity to MD stretch ratio of greater than 1.2,
    wherein the product has an absorbent capacity greater than 12.2 g/g, and
    wherein the paper towel product is produced without cellulase enzymes.

2. The paper towel product of claim 1, wherein the product has a ball burst to MD stretch ratio of greater than 100.

3. The paper towel product of claim 1, wherein (ball burst X absorbent capacity)/MD stretch of the product has a value greater than 1250.

4. The paper towel product of claim 1, wherein the first channels have a channel angle relative to machine direction between 5 and 25 degrees.

5. The paper towel product of claim 1, wherein the product has an Str value less than 0.15.

6. The paper towel product of claim 1, wherein the product has an Str value of less than 0.15 and a channel angle relative to machine direction greater than 2 degrees.

7. The paper towel product of claim 1, wherein the product has an absorbent capacity of at least 12.9 g/g.

8. The paper towel product of claim 1, wherein the product has an absorbent capacity of at least 14.2 g/g.

9. The paper towel product of claim 1, wherein the product has a basis weight in the range of 39 gsm to 42 gsm.

10. The paper towel product of claim 1, wherein at least some of the plurality of second ridges extend from one of the plurality of first ridges to another one of the plurality of first ridges.

\* \* \* \* \*